United States Patent
Damnjanovic et al.

(10) Patent No.: US 10,123,301 B2
(45) Date of Patent: Nov. 6, 2018

(54) TECHNIQUES FOR TRANSMITTING AND RECEIVING PAGING MESSAGES OVER AN UNLICENSED RADIO FREQUENCY SPECTRUM BAND

(71) Applicant: QUALCOMM Incorporated, San Diego, CA (US)

(72) Inventors: Aleksandar Damnjanovic, Del Mar, CA (US); Madhavan Srinivasan Vajapeyam, San Diego, CA (US); Durga Prasad Malladi, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/708,030

(22) Filed: Sep. 18, 2017

(65) Prior Publication Data

US 2018/0007657 A1    Jan. 4, 2018

Related U.S. Application Data

(63) Continuation of application No. 14/818,794, filed on Aug. 5, 2015, now Pat. No. 9,769,789.

(Continued)

(51) Int. Cl.
*H04W 68/00* (2009.01)
*H04W 72/04* (2009.01)
(Continued)

(52) U.S. Cl.
CPC ....... *H04W 68/005* (2013.01); *H04W 68/025* (2013.01); *H04W 72/0453* (2013.01);
(Continued)

(58) Field of Classification Search
CPC ...... H04W 4/00; H04W 76/025; H04W 84/04
(Continued)

(56) References Cited

U.S. PATENT DOCUMENTS

| 9,769,789 B2 | 9/2017 | Damnjanovic et al. |
| 2002/0077087 A1 | 6/2002 | Li |

(Continued)

FOREIGN PATENT DOCUMENTS

| EP | 1909524 | 4/2008 |
| KR | 20060015649 A | 2/2006 |
| WO | WO-2014097707 A1 | 6/2014 |

OTHER PUBLICATIONS

ISA/EP, International Search Report and Written Opinion of the International Searching Authority, Int'l Application No. PCT/US2015/043973, dated Oct. 27, 2015, European Patent Office, Rijswijk, NL, 10 pgs.

(Continued)

*Primary Examiner* — Sam Bhattacharya
(74) *Attorney, Agent, or Firm* — Liem T. Do

(57) ABSTRACT

Techniques are described for wireless communication. A first method includes receiving a transmission including a paging group indicator and an indication of a time window. The transmission may be received at a user equipment (UE) over an unlicensed radio frequency spectrum band. The first method may also include monitoring, based on the paging group indicator, the unlicensed radio frequency spectrum band during the time window to receive an asynchronous paging message from a base station. A second method includes transmitting the transmission over the unlicensed radio frequency spectrum band; performing a number of clear channel assessments (CCAs) on the unlicensed radio frequency spectrum band during the time window; and transmitting the paging message over the unlicensed radio frequency spectrum band at a transmission time during the (Continued)

time window. The transmission time may be based on a result of at least one of the CCAs.

30 Claims, 18 Drawing Sheets

Related U.S. Application Data

(60) Provisional application No. 62/040,709, filed on Aug. 22, 2014.

(51) Int. Cl.
*H04W 72/12* (2009.01)
*H04W 68/02* (2009.01)
*H04W 16/14* (2009.01)
*H04W 74/08* (2009.01)

(52) U.S. Cl.
CPC ........ *H04W 72/1289* (2013.01); *H04W 16/14* (2013.01); *H04W 74/0808* (2013.01)

(58) Field of Classification Search
USPC .............. 455/412.1, 412.2, 413, 414.1, 415
See application file for complete search history.

(56) References Cited

U.S. PATENT DOCUMENTS

| | | |
|---|---|---|
| 2006/0079258 A1 | 4/2006 | Gallagher et al. |
| 2008/0318599 A1 | 12/2008 | Gallagher et al. |
| 2012/0030358 A1 | 2/2012 | Mackenzie |
| 2013/0163543 A1 | 6/2013 | Freda et al. |
| 2015/0250002 A1 | 9/2015 | Sun et al. |

OTHER PUBLICATIONS

Ericsson et al., "Study on Licensed-Assisted Access using LTE," 3GPP TSG RAN Meeting #65, RP-141664 (revision of RP-141646), Edinburgh, Scotland, Sep. 9-12, 2014, 8 pgs., 3rd Generation Partnership Project.
NTT Docomo, Inc, "Views on LAA for Unlicensed Spectrum-Scenarios and Initial Evaluation Results," 3GPP Workshop on LTE in Unlicensed Spectrum, RWS-140026, Sophia Antipolis, France, Jun. 13, 2014, 12 pgs., 3rd Generation Partnership Project.

TECHNIQUES FOR TRANSMITTING AND RECEIVING PAGING MESSAGES OVER AN UNLICENSED RADIO FREQUENCY SPECTRUM BAND

CROSS REFERENCES

The present Application for Patent is a continuation of U.S. patent application Ser. No. 14/818,794 by Damnjanovic et al., entitled "Techniques for Transmitting and Receiving Paging Messages Over an Unlicensed Radio Frequency Spectrum Band," filed Aug. 5, 2015, which claims priority to U.S. Provisional Patent Application No. 62/040,709 by Damnjanovic et al., entitled "Techniques for Transmitting and Receiving Paging Messages Over an Unlicensed Radio Frequency Spectrum Band," filed Aug. 22, 2014, assigned to the assignee hereof, and expressly incorporated by reference herein.

FIELD OF THE DISCLOSURE

The present disclosure, for example, relates to wireless communication systems, and more particularly to techniques for transmitting and receiving paging messages over an unlicensed radio frequency spectrum band.

BACKGROUND

Wireless communication systems are widely deployed to provide various types of communication content such as voice, video, packet data, messaging, broadcast, and so on. These wireless communication systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication apparatuses, otherwise known as user equipments (UEs). A base station may communicate with UEs on downlink channels (e.g., for transmissions from a base station to a UE) and uplink channels (e.g., for transmissions from a UE to a base station).

Some modes of communication may enable communications between a base station and a UE over an unlicensed radio frequency spectrum band, or over different radio frequency spectrum bands (e.g., a licensed radio frequency spectrum band and/or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. An unlicensed radio frequency spectrum band may also provide service in areas where access to a licensed radio frequency spectrum band is unavailable.

Prior to gaining access to, and communicating over, an unlicensed radio frequency spectrum band, a base station or UE may perform a listen before talk (LBT) procedure to contend for access to the unlicensed radio frequency spectrum band. An LBT procedure may include performing a clear channel assessment (CCA) procedure to determine whether a channel of the unlicensed radio frequency spectrum band is available. When it is determined that the channel of the unlicensed radio frequency spectrum band is not available (e.g., because another apparatus is already using the channel of the unlicensed radio frequency spectrum band), a CCA procedure may be performed for the channel again at a later time.

When operating as a serving cell for a UE, a base station may transmit paging messages to the UE. A paging message may indicate to the UE that the base station has data to transmit to the UE, or that the base station desires the UE to perform a procedure.

SUMMARY

The present disclosure, for example, relates to one or more techniques for transmitting and receiving paging messages over an unlicensed radio frequency spectrum band. In some environments, a user equipment (UE) may be unable to receive paging messages over a licensed radio frequency spectrum band (e.g., because the UE is not capable of communicating over the licensed radio frequency spectrum band, or because access to the licensed radio frequency spectrum band is unavailable). In these environments, a base station may in some cases transmit paging messages over an unlicensed radio frequency spectrum band. However, when, for example, the signal-to-noise plus interference ratio (SNIR) on the unlicensed radio frequency spectrum band is low, or when other transmitting apparatuses prevent the base station from successfully contending for access to the unlicensed radio frequency spectrum band, the base station may be unable to get its paging messages to one or more UEs. This may interfere with the base station's ability to communicate with the UEs.

The described techniques enable a base station to transmit paging messages over an unlicensed radio frequency spectrum band in a synchronous, asynchronous, and/or opportunistic manner, which may improve the base station's ability to get its paging messages to its connected UEs. System information may also be transmitted over an unlicensed radio frequency spectrum band in a synchronous, asynchronous, and/or opportunistic manner.

In a first set of illustrative examples, a method for wireless communication is described. In one example, the method may include receiving, at a UE during a predetermined time over an unlicensed radio frequency spectrum band, a transmission including a paging group indicator and an indication of a time window; and monitoring, based on the paging group indicator, the unlicensed radio frequency spectrum band during the time window to receive an asynchronous paging message from a base station. The predetermined time may be associated with a clear channel assessment (CCA)-exempt transmission (CET) or a Listen Before Talk (LBT) procedure.

In some examples, the method may include determining that the paging group indicator corresponds to a paging group associated with the UE. In these examples, monitoring the unlicensed radio frequency spectrum band during the time window may be in response to the determination.

In some examples, the method may include receiving an indication of an end of the paging message from the base station. In some examples of the method, the time window may include a period immediately following the transmission. In some examples of the method, monitoring the unlicensed radio frequency spectrum band during the time window may include waking up a receiver of the UE from a sleep state prior to the time window. In some examples of the method, the transmission may include at least a portion of the paging message.

In some examples of the method, the paging group indicator may correspond to each UE connected to the base station. In some examples, the paging group indicator may correspond to a subset of UEs connected to the base station. In some examples, the transmission may include a plurality of paging group indicators and may signal different time windows for different ones of the plurality of paging group indicators.

In some examples, the method may include monitoring the unlicensed radio frequency spectrum band during a periodic fixed subframe location to receive a transmission of the paging message subject to CCA from the base station. In some examples, the time window may be associated with a different set of subcarrier frequencies of the unlicensed radio frequency spectrum band than the transmission subject to CCA. In some examples, the time window may overlap in time with the periodic fixed subframe location of the base station.

In some examples of the method, the indication of the time window may be received in a system information block or a master information block. In some examples of the method, the indication of the time window may be received in a radio resource control (RRC) message.

In a second set of illustrative examples, an apparatus for wireless communication is described. In one example, the apparatus may include means for receiving, at a UE during a predetermined time over an unlicensed radio frequency spectrum band, a transmission including a paging group indicator and an indication of a time window; and means for monitoring, based on the paging group indicator, the unlicensed radio frequency spectrum band during the time window to receive a paging message from a base station. The predetermined time may be associated with a CET or an LBT procedure. In some examples, the apparatus may further include means for implementing one or more aspects of the method for wireless communication described above with respect to the first set of illustrative examples.

In a third set of illustrative examples, another apparatus for wireless communication is described. In one example, the apparatus may include a processor and memory coupled to the processor. The processor may be configured to receive, at a UE during a predetermined time over an unlicensed radio frequency spectrum band, a transmission including a paging group indicator and an indication of a time window; and monitor, based on the paging group indicator, the unlicensed radio frequency spectrum band during the time window to receive a paging message from a base station. The predetermined time may be associated with a CET or an LBT procedure. In some examples, the processor may also be configured to implement one or more aspects of the method for wireless communication described above with respect to the first set of illustrative examples.

In a fourth set of illustrative examples, a non-transitory computer-readable medium for storing instructions executable by a processor for wireless communication is described. In one example, the computer-readable medium may include instructions to receive, at a UE during a predetermined time over an unlicensed radio frequency spectrum band, a transmission including a paging group indicator and an indication of a time window; and instructions to monitor, based on the paging group indicator, the unlicensed radio frequency spectrum band during the time window to receive a paging message from a base station. The predetermined time may be associated with a CET or an LBT procedure. In some examples, the computer-readable medium may also include instructions to implement one or more aspects of the method for wireless communication described above with respect to the first set of illustrative examples.

In a fifth set of illustrative examples, another method for wireless communication is described. In one example, the method may include transmitting, over an unlicensed radio frequency spectrum band, a transmission including a paging group indicator and an indication of a time window. The method may also include performing a number of CCAs on the unlicensed radio frequency spectrum band during the time window, and transmitting a paging message associated with the paging group indicator over the unlicensed radio frequency spectrum band at a transmission time during the time window, where the transmission time is based on a result of at least one of the CCAs.

In some examples of the method, performing the number of CCAs on the unlicensed radio frequency spectrum band during the time window may include identifying a first successful one of the CCAs during the time window. In these examples, the transmission time may follow the first successful one of the CCAs during the time window.

In some examples of the method, performing the number of CCAs on the unlicensed radio frequency spectrum band during the time window may include determining that none of the CCAs performed during the time window were successful. In these examples, the transmission time may occur at an end of the time window.

In some examples, the method may include transmitting an indication of an end of the paging message from the base station. In some examples of the method, the time window may include a period immediately following the transmission. In some examples, the transmission may include at least a portion of the paging message. In some examples, the paging group indicator may correspond to each UE connected to the base station. In some examples, the paging group indicator may correspond to a subset of UEs connected to the base station. In some examples, the transmission may include a plurality of paging group indicators and may signal a different time window for different ones of the plurality of paging group indicators.

In some examples, the method may include transmitting the paging message over the unlicensed radio frequency spectrum band opportunistically during a periodic fixed subframe location. In some examples, the time window may be associated with a different set of subcarrier frequencies of the unlicensed radio frequency spectrum band than the transmission subject to CCA. In some examples, the time window may overlap in time with the periodic fixed subframe locations of the base station.

In some examples of the method, the indication of the time window may be transmitted in a system information block or a master information block. In some examples of the method, the indication of the time window may be transmitted in an RRC message.

In a sixth set of illustrative examples, another apparatus for wireless communication is described. In one example, the apparatus may include means for transmitting, over an unlicensed radio frequency spectrum band, a transmission including a paging group indicator and an indication of a time window. The apparatus may also include means for performing a number of CCAs on the unlicensed radio frequency spectrum band during the time window, and means for transmitting a paging message associated with the paging group indicator over the unlicensed radio frequency spectrum band at a transmission time during the time window, where the transmission time is based on a result of at least one of the CCAs. In some examples, the apparatus may further include means for implementing one or more aspects of the method for wireless communication described above with respect to the fifth set of illustrative examples.

In a seventh set of illustrative examples, another apparatus for wireless communication is described. In one example, the apparatus may include a processor and memory coupled to the processor. The processor may be configured to transmit, over an unlicensed radio frequency spectrum band, a transmission including a paging group indicator and an indication of a time window. The processor may also be configured to perform a number of CCAs on the unlicensed radio frequency spectrum band during the time window, and transmit a paging message associated with the paging group indicator over the unlicensed radio frequency spectrum band at a transmission time during the time window, where the transmission time is based on a result of at least one of the CCAs. In some examples, the processor may also be configured to implement one or more aspects of the method for wireless communication described above with respect to the fifth set of illustrative examples.

In an eighth set of illustrative examples, a non-transitory computer-readable medium for storing instructions executable by a processor for wireless communication is described. The computer-readable medium may include instructions to transmit, over an unlicensed radio frequency spectrum band, a transmission including a paging group indicator and an indication of a time window. The computer-readable medium may also include instructions to perform a number of CCAs on the unlicensed radio frequency spectrum band during the time window, and instructions to transmit a paging message associated with the paging group indicator over the unlicensed radio frequency spectrum band at a transmission time during the time window, where the transmission time is based on a result of at least one of the CCAs. In some examples, the computer-readable medium may also include instructions to implement one or more aspects of the method for wireless communication described above with respect to the fifth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If the first reference label is used in the specification, the description is applicable to any one of the similar components having the same first reference label irrespective of the second reference label.

DETAILED DESCRIPTION

Figure 1:
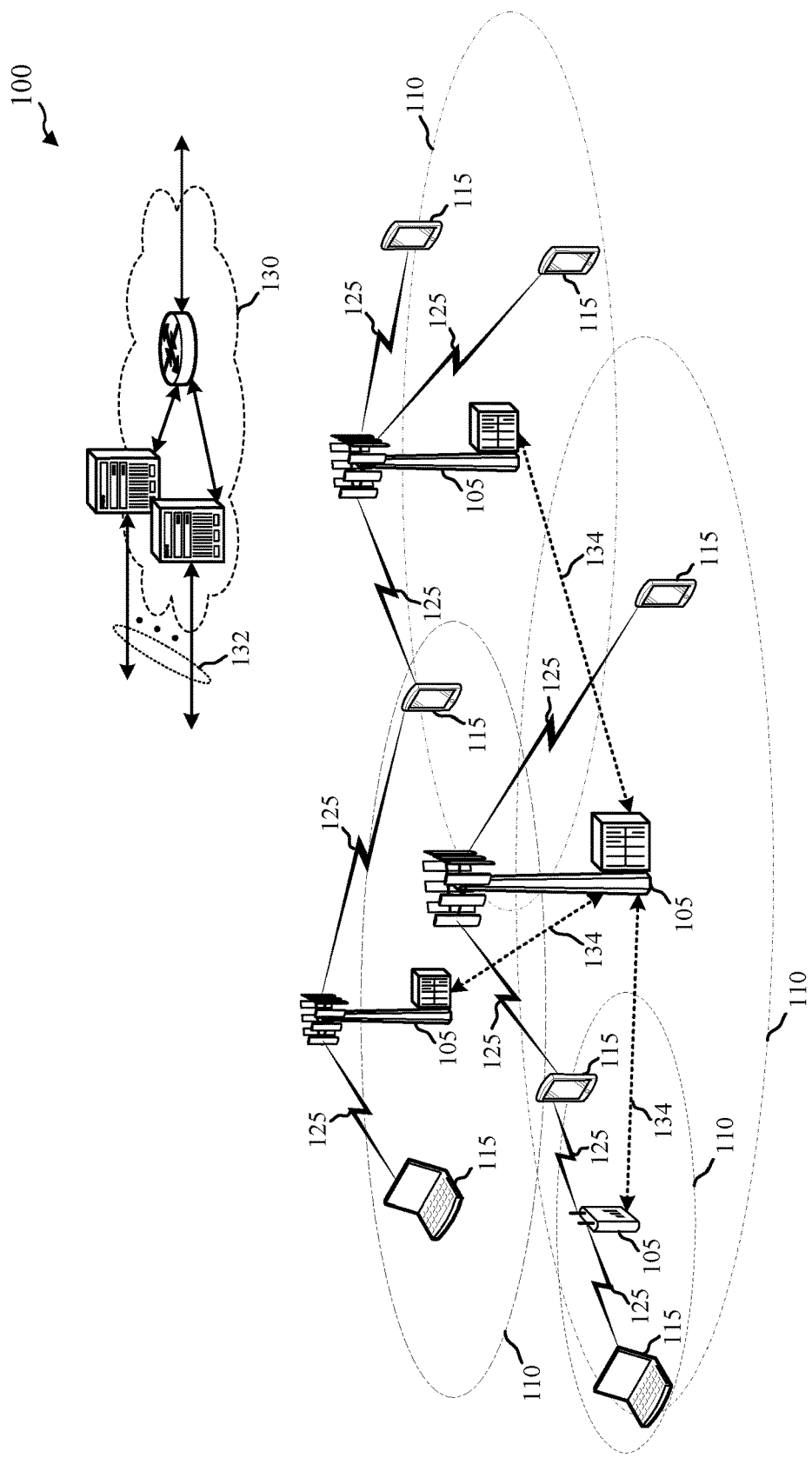
FIG. 1 illustrates an example of a wireless communication system, in accordance with various aspects of the disclosure.

Techniques are described in which an unlicensed radio frequency spectrum band is used for at least a portion of communications over a wireless communication system. In some examples, the unlicensed radio frequency spectrum band may be used by the base stations and user equipments (UEs) of a cellular network for Long Term Evolution (LTE) communications and/or LTE-Advanced (LTE-A) communications, and by Wi-Fi access points and Wi-Fi stations of a Wi-Fi network for Wi-Fi communications. The unlicensed radio frequency spectrum band may be used by the cellular network in combination with, or independent from, a licensed radio frequency spectrum band. In some examples, the unlicensed radio frequency spectrum band may be a radio frequency spectrum band for which an apparatus may need to contend for access because the radio frequency spectrum band is available, at least in part, for unlicensed use, such as Wi-Fi use.

Prior to gaining access to, and communicating over, an unlicensed radio frequency spectrum band, a base station or UE may perform a listen before talk (LBT) procedure to contend for access to the unlicensed radio frequency spectrum band. An LBT procedure may include performing a clear channel assessment (CCA) procedure to determine whether a channel of the unlicensed radio frequency spectrum band is available. When it is determined that the channel of the unlicensed radio frequency spectrum band is not available (e.g., because another apparatus is already using the channel of the unlicensed radio frequency spectrum band), a CCA procedure may be performed for the channel again at a later time.

In some environments, the SNIR of the unlicensed radio frequency spectrum band may be low, or other transmitting apparatuses may prevent a base station from successfully contending for access to the unlicensed radio frequency spectrum band. In these environments, the base station may be unable to get paging messages to one or more connected UEs. This may interfere with the base station's ability to communicate with the UEs.

The described techniques enable a base station to transmit paging messages over an unlicensed radio frequency spectrum band in a synchronous, asynchronous, and/or opportunistic manner, which may improve the base station's ability to get its paging messages to its connected UEs. System information may also be transmitted over an unlicensed radio frequency spectrum band in a synchronous, asynchronous, and/or opportunistic manner. In some examples, a base station may transmit an indication of a time window, and may asynchronously transmit paging messages and/or system information during the time window.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communication system 100, in accordance with various aspects of the disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro and/or small cell base stations). There may be overlapping geographic coverage areas 110 for different technologies.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which apparatuses may need to contend for access because the radio frequency spectrum band is available for unlicensed use, such as Wi-Fi use). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

The wireless communication system 100 may be or include a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid Automatic Repeat Request (HARD) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink (DL) transmissions, from a base station 105 to a UE 115, and/or uplink (UL) transmissions from a UE 115 to a base station 105. The downlink transmissions may also be called forward link transmissions, while the uplink transmissions may also be called reverse link transmissions. In some examples, DL transmissions may include transmissions of discovery signals, including, for example, reference signals and/or synchronization signals.

In some examples, each of the communication links 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a frequency division duplex (FDD) operation (e.g., using paired spectrum resources) or a time division duplex (TDD) operation (e.g., using unpaired spectrum resources). Frame structures for FDD operation (e.g., frame structure type 1) and TDD operation (e.g., frame structure type 2) may be defined.

Each carrier may be provided over a licensed radio frequency spectrum band or an unlicensed radio frequency spectrum band, and a set of carriers used in a particular mode of communication may all be received (e.g., at a UE 115) over the licensed radio frequency spectrum band, all be received (e.g., at a UE 115) over the unlicensed radio frequency spectrum band, or be received (e.g., at a UE 115) over a combination of the licensed radio frequency spectrum band and the unlicensed radio frequency spectrum band.

In some embodiments of the wireless communication system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some examples, a base station 105 may need to transmit a paging message to one or more of its connected UEs 115. For purposes of paging, a base station's connected UEs 115 may be grouped together in one paging group, or divided into a plurality of paging groups. A paging group may include one UE or a plurality of UEs 115. In some examples, a base station may transmit paging messages to the UEs 115 of a paging group in a synchronous manner, during a CCA-exempt transmission (CET), or in a synchronous and opportunistic manner, during a fixed periodic subframe location following a successful CCA procedure. In some examples, a base station may transmit an indication of a time window to the UEs 115 of a paging group, and transmit paging messages to the UEs 115 of the paging group during the time window. In some examples, paging messages may be transmitted for multiple paging groups, with each paging group being paged (or not paged) according to the status of one bit in a bitmap (e.g., the bitmap may include one bit per paging group). A UE 115 may monitor the CET for a paging group indicator corresponding to its paging group. When the UE 115 determines that the CET includes a paging group indicator corresponding to its paging group, it may monitor the CET, a fixed periodic subframe location, and/or an indicated time window for a paging message corresponding to its paging group. When the paging message is transmitted in multiple locations, the UE 115 may enter a sleep mode upon receiving the paging message in any location. When the UE 115 determines that the CET does not include a paging group indicator corresponding to its paging group, it may enter a sleep mode.

In some examples of the wireless communication system 100, LTE/LTE-A may be deployed under different scenarios using an unlicensed radio frequency spectrum band. The deployment scenarios may include a supplemental downlink mode in which LTE/LTE-A downlink communications in a licensed radio frequency spectrum band may be offloaded to the unlicensed radio frequency spectrum band, a carrier aggregation mode in which both LTE/LTE-A downlink and uplink communications may be offloaded from the licensed radio frequency spectrum band to the unlicensed radio frequency spectrum band, and/or a standalone mode in which LTE/LTE-A downlink and uplink communications between a base station 105 and a UE 115 may take place in the unlicensed radio frequency spectrum band. Base stations 105 as well as UEs 115 may in some examples support one or more of these or similar modes of operation. In some examples, OFDMA waveforms may be used in the communication links 125 for LTE/LTE-A downlink communications in the licensed radio frequency spectrum band and/or the unlicensed radio frequency spectrum band, while OFDMA, SC-FDMA and/or resource block interleaved FDMA waveforms may be used in the communication links 125 for LTE/LTE-A uplink communications in the licensed radio frequency spectrum band and/or the unlicensed radio frequency spectrum band.

Figure 2:
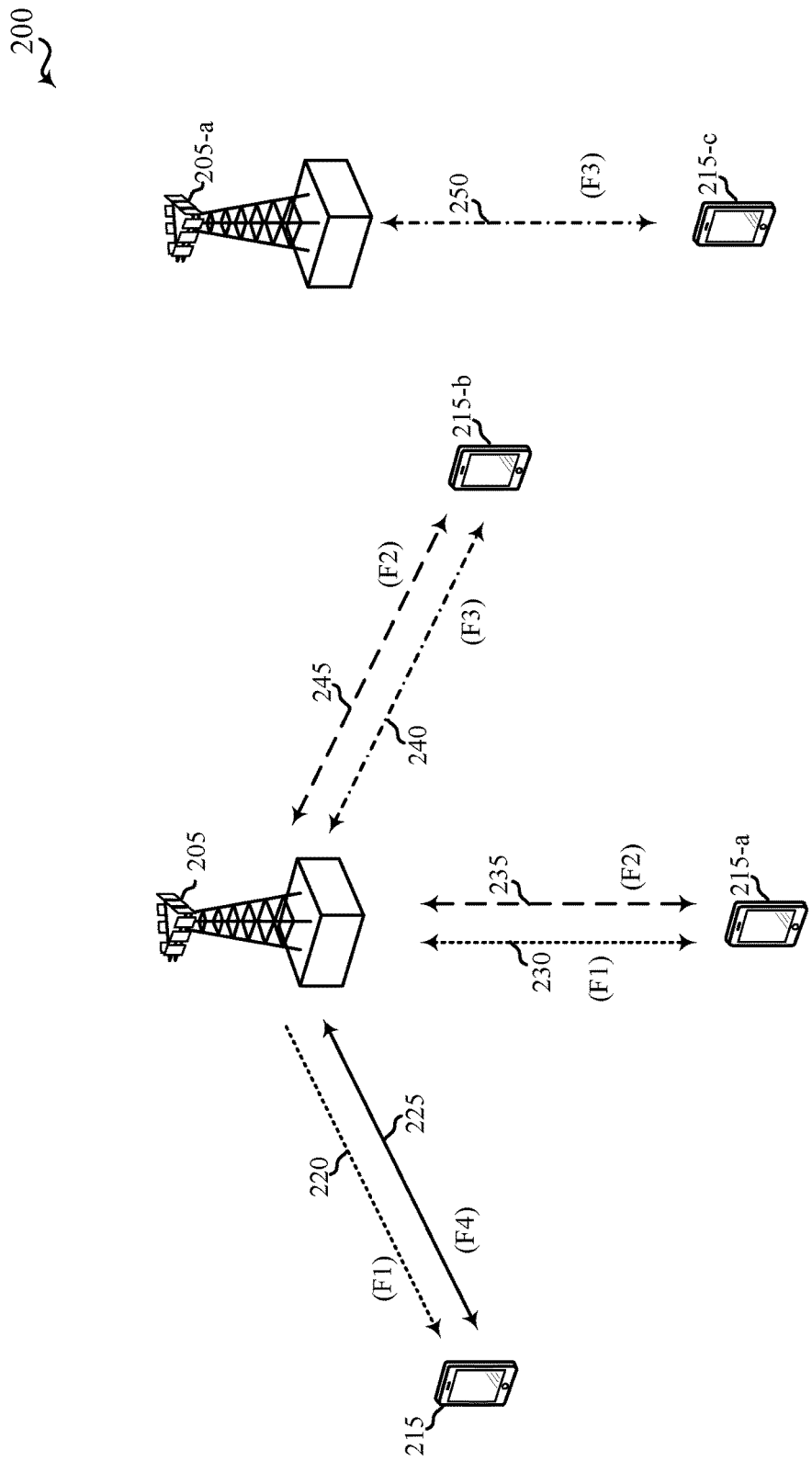
FIG. 2 shows a wireless communication system in which Long Term Evolution (LTE)/LTE-Advanced (LTE-A) may be deployed under different scenarios using an unlicensed radio frequency spectrum band, in accordance with various aspects of the present disclosure.

FIG. 2 shows a wireless communication system 200 in which LTE/LTE-A may be deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum band and needs to relieve some of the traffic and/or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, and/or resource block interleaved FDMA waveforms from the second UE 215-a using the second bidirectional link 230. The second bidirectional link 230 may be associated with the frequency F1 in the unlicensed radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum band and needs to relieve some of the traffic and/or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, and/or resource block interleaved waveforms from the third UE 215-b using the fourth bidirectional link 240. The fourth bidirectional link 240 may be associated with a frequency F3 in the unlicensed radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and use an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, and/or resource block interleaved FDMA waveforms from the fourth UE 215-*c* using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, and/or 205-*a* described with reference to FIG. 1 and/or 2, and/or one of the UEs 115, 215, 215-*a*, 215-*b*, and/or 215-*c* described with reference to FIG. 1 and/or 2, may use a gating interval to gain access to a channel of an unlicensed radio frequency spectrum band (e.g., to a physical channel of the unlicensed radio frequency spectrum band). In some examples, the gating interval may be periodic. For example, the periodic gating interval may be synchronized with at least one boundary of an LTE/LTE-A radio interval. The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure (e.g., an LBT procedure) such as a clear channel assessment (CCA) procedure. The outcome of the CCA procedure may indicate to the transmitting apparatus whether a channel of an unlicensed radio frequency spectrum band is available or in use for the gating interval (also referred to as an LBT radio frame). When a CCA procedure indicates that the channel is available for a corresponding LBT radio frame (e.g., "clear" for use), the transmitting apparatus may reserve and/or use the channel of the unlicensed radio frequency spectrum band during part or all of the LBT radio frame. When the CCA procedure indicates that the channel is not available (e.g., that the channel is in use or reserved by another transmitting apparatus), the transmitting apparatus may be prevented from using the channel during the LBT radio frame.

Figure 3:
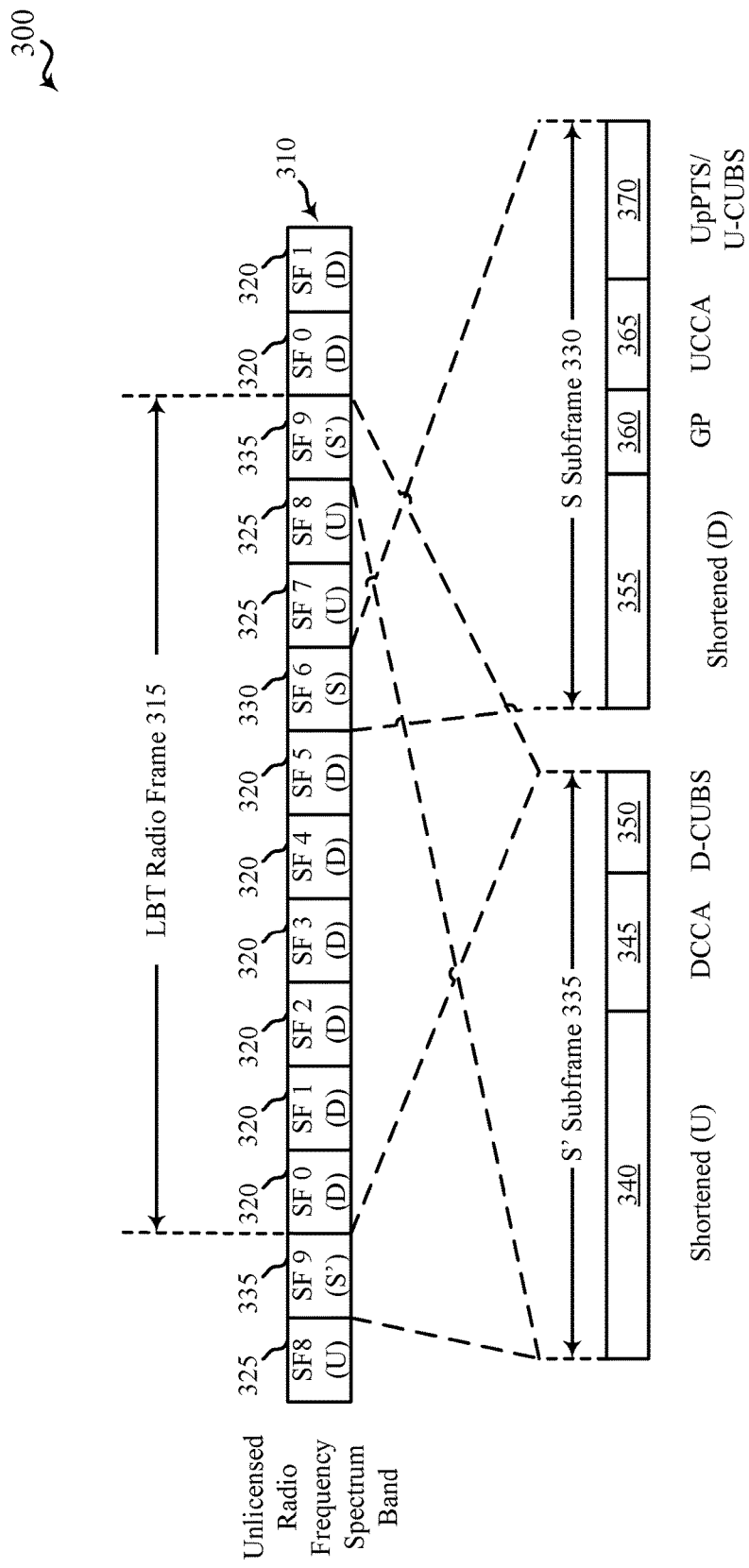
FIG. 3 shows an example of a wireless communication over an unlicensed radio frequency spectrum band, in accordance with various aspects of the present disclosure.

FIG. 3 shows an example 300 of a wireless communication 310 over an unlicensed radio frequency spectrum band, in accordance with various aspects of the present disclosure. In some examples, an LBT radio frame 315 may have a duration of ten milliseconds and include a number of downlink (D) subframes 320, a number of uplink (U) subframes 325, and two types of special subframes, an S subframe 330 and an S' subframe 335. The S subframe 330 may provide a transition between downlink (D) subframes 320 and uplink (U) subframes 325, while the S' subframe 335 may provide a transition between uplink (U) subframes 325 and downlink (D) subframes 320.

During the S' subframe 335, a downlink clear channel assessment (DCCA) procedure 345 may be performed by one or more base stations, such as one or more of the base stations 105, 205, and/or 205-*a* described with reference to FIG. 1 and/or 2, to reserve, for a period of time, a channel of the unlicensed radio frequency spectrum band over which the wireless communication 310 occurs. Following a successful DCCA procedure 345 by a base station, the base station may transmit a channel usage beacon signal (CUBS) (e.g., a downlink CUBS (D-CUBS 350)) to provide an indication to other base stations and/or apparatuses (e.g., UEs, Wi-Fi access points, etc.) that the base station has reserved the channel. In some examples, a D-CUBS 350 may be transmitted using a plurality of interleaved resource blocks. Transmitting a D-CUBS 350 in this manner may enable the D-CUBS 350 to occupy at least a certain percentage of the available frequency bandwidth of the unlicensed radio frequency spectrum band and satisfy one or more regulatory requirements (e.g., a requirement that transmissions over the unlicensed radio frequency spectrum band occupy at least 80% of the available frequency bandwidth). The D-CUBS 350 may in some examples take a form similar to that of an LTE/LTE-A CRS and/or a channel state information reference signal (CSI-RS). When the DCCA procedure 345 fails, the D-CUBS 350 may not be transmitted.

The S' subframe 335 may include a plurality of OFDM symbol periods (e.g., 14 OFDM symbol periods). A first portion of the S' subframe 335 may be used by a number of UEs as a shortened uplink (U) period. A second portion of the S' subframe 335 may be used for the DCCA procedure 345. A third portion of the S' subframe 335 may be used by one or more base stations that successfully contend for access to the channel of the unlicensed radio frequency spectrum band to transmit the D-CUBS 350.

During the S subframe 330, an uplink CCA (UCCA) procedure 365 may be performed by one or more UEs, such as one or more of the UEs 115, 215, 215-*a*, 215-*b*, and/or 215-*c* described above with reference to FIG. 1 and/or 2, to reserve, for a period of time, the channel over which the wireless communication 310 occurs. Following a successful UCCA procedure 365 by a UE, the UE may transmit an uplink CUBS (U-CUBS 370) to provide an indication to other UEs and/or apparatuses (e.g., base stations, Wi-Fi access points, etc.) that the UE has reserved the channel. In some examples, a U-CUBS 370 may be transmitted using a plurality of interleaved resource blocks. Transmitting a U-CUBS 370 in this manner may enable the U-CUBS 370 to occupy at least a certain percentage of the available frequency bandwidth of the unlicensed radio frequency spectrum band and satisfy one or more regulatory requirements (e.g., the requirement that transmissions over the unlicensed radio frequency spectrum band occupy at least 80% of the available frequency bandwidth). The U-CUBS 370 may in some examples take a form similar to that of an LTE/LTE-A CRS and/or CSI-RS. When the UCCA procedure 365 fails, the U-CUBS 370 may not be transmitted.

The S subframe 330 may include a plurality of OFDM symbol periods (e.g., 14 OFDM symbol periods). A first portion of the S subframe 330 may be used by a number of base stations as a shortened downlink (D) period 355. A second portion of the S subframe 330 may be used as a guard period (GP) 360. A third portion of the S subframe 330 may be used for the UCCA procedure 365. A fourth portion of the S subframe 330 may be used by one or more UEs that successfully contend for access to the channel of the unlicensed radio frequency spectrum band as an uplink pilot time slot (UpPTS) and/or to transmit the U-CUBS 370.

In some examples, the DCCA procedure 345 and/or the UCCA procedure 365 may include the performance of a single CCA procedure. In other examples, the DCCA procedure 345 and/or the UCCA procedure 365 may include the performance of an extended CCA procedure. The extended CCA procedure may include a random number of CCA procedures, and in some examples may include a plurality of CCA procedures.

Figure 4:
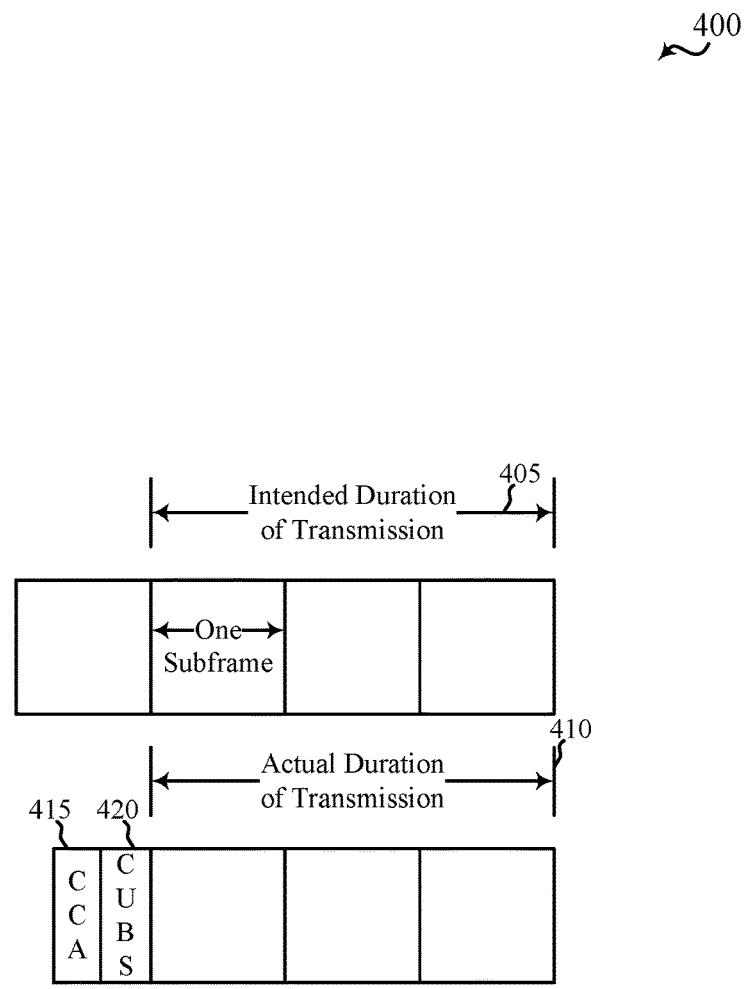
FIG. 4 shows an example of a clear channel assessment (CCA) procedure performed by a transmitting apparatus when contending for access to an unlicensed radio frequency spectrum band, in accordance with various aspects of the present disclosure.

FIG. 4 shows an example 400 of a CCA procedure 415 performed by a transmitting apparatus when contending for access to an unlicensed radio frequency spectrum band, in accordance with various aspects of the present disclosure. In some examples, the CCA procedure 415 may be an example of the DCCA procedure 345 or UCCA procedure 365 described with reference to FIG. 3. The CCA procedure 415 may have a fixed duration. In some examples, the CCA procedure 415 may be performed in accordance with an LBT-frame based equipment (LBT-FBE) protocol (e.g., the LBT-FBE protocol described by EN 301 893). Following the CCA procedure 415, a CUBS 420 may be transmitted, followed by a data transmission (e.g., an uplink transmission or a downlink transmission). By way of example, the data transmission may have an intended duration 405 of three subframes and an actual duration 410 of three subframes.

Figure 5:
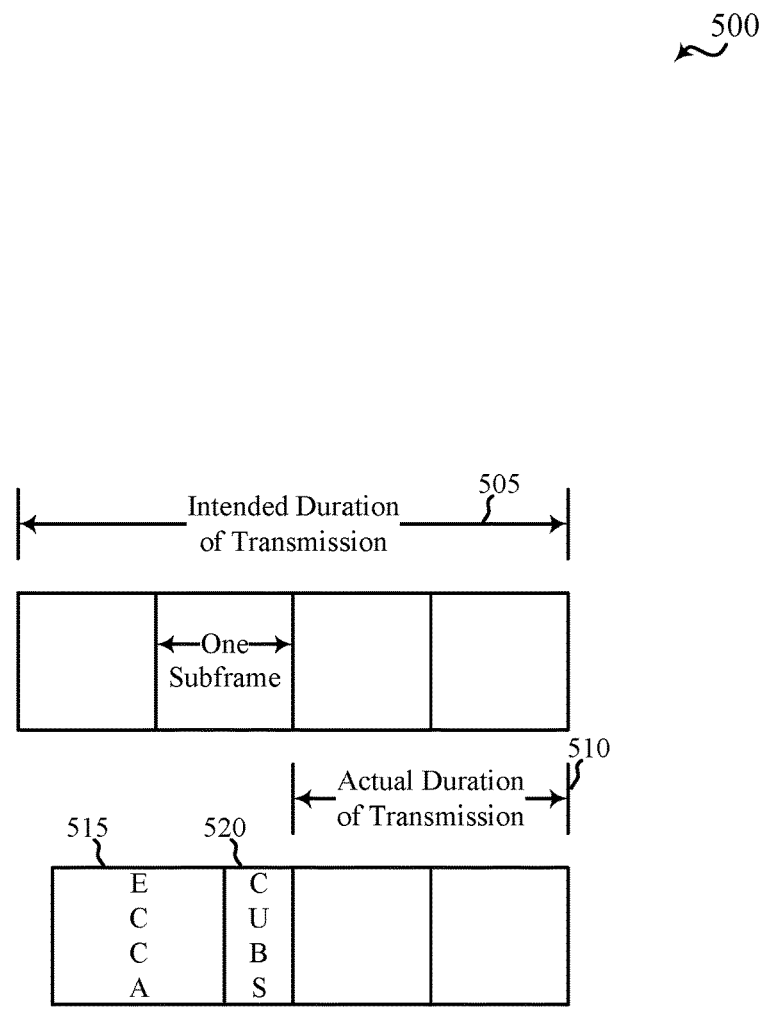
FIG. 5 shows an example of an extended CCA (ECCA) procedure performed by a transmitting apparatus when contending for access to an unlicensed radio frequency spectrum band, in accordance with various aspects of the present disclosure.

FIG. 5 shows an example 500 of an extended CCA (ECCA) procedure 515 performed by a transmitting apparatus when contending for access to an unlicensed radio frequency spectrum band, in accordance with various aspects of the present disclosure. In some examples, the ECCA procedure 515 may be an example of the DCCA procedure 345 or UCCA procedure 365 described with reference to FIG. 3. The ECCA procedure 515 may include a random number of CCA procedures, and in some examples may include a plurality of CCA procedures. The ECCA procedure 515 may therefore have a variable duration. In some examples, the ECCA procedure 515 may be performed in accordance with an LBT-load based equipment (LBT-LBE) protocol (e.g., the LBT-LBE protocol described by EN 301 893). The ECCA procedure 515 may provide a greater likelihood of winning contention to access the unlicensed radio frequency spectrum band, but at a potential cost of a shorter data transmission. Following the ECCA procedure 515, a CUBS 520 may be transmitted, followed by a data transmission. By way of example, the data transmission may have an intended duration 505 of four subframes and an actual duration 510 of two subframes.

In some examples, a wireless communication over an unlicensed radio frequency spectrum band may be made without first performing a CCA procedure (e.g., without first performing the DCCA procedure 345 and/or the UCCA procedure 365 described with reference to FIG. 3). A wireless communication made over an unlicensed radio frequency spectrum band without first performing a CCA procedure may be referred to as a CCA-Exempt Transmission (CET). To minimize contention over an unlicensed radio frequency spectrum band, a CET may be transmitted according to a transmission period, which transmission period may have a duration that is longer, and in some examples much longer, than a duration of an LBT radio frame. For example, for an LBT radio frame having a duration of ten milliseconds (10 ms), a CET may be transmitted according to a transmission period having a duration of eighty milliseconds (80 ms). In some examples, a transmission period may have a configurable periodicity. In some examples, a transmission may have a duration equal to or less than the duration of an LBT radio frame.

In some examples, a base station such as one of the base stations 105, 205, and/or 205-a described with reference to FIG. 1 and/or 2 may have guaranteed access to a licensed radio frequency spectrum band and may transmit paging messages over the licensed radio frequency spectrum band on a regular, periodic basis (e.g., during an LBT radio frame such as the LBT radio frame 315 described with reference to FIG. 3). However, some base stations 105 may not have access to a licensed radio frequency spectrum band, and/or some UEs 115 may not have access to (or be capable of communicating over) a licensed radio frequency spectrum band. In these latter examples, the base station 105 may have access to an unlicensed radio frequency spectrum band. However, because the base station 105 may be configured to contend for access to the unlicensed radio frequency spectrum band, the base station's transmission of paging messages over the unlicensed radio frequency spectrum band may be interfered with due to low SNIR and/or an inability to successfully contend for access to the unlicensed radio frequency spectrum band when desired. This description describes techniques for transmitting and receiving paging messages over an unlicensed radio frequency spectrum band, within a time window.

Figure 6:
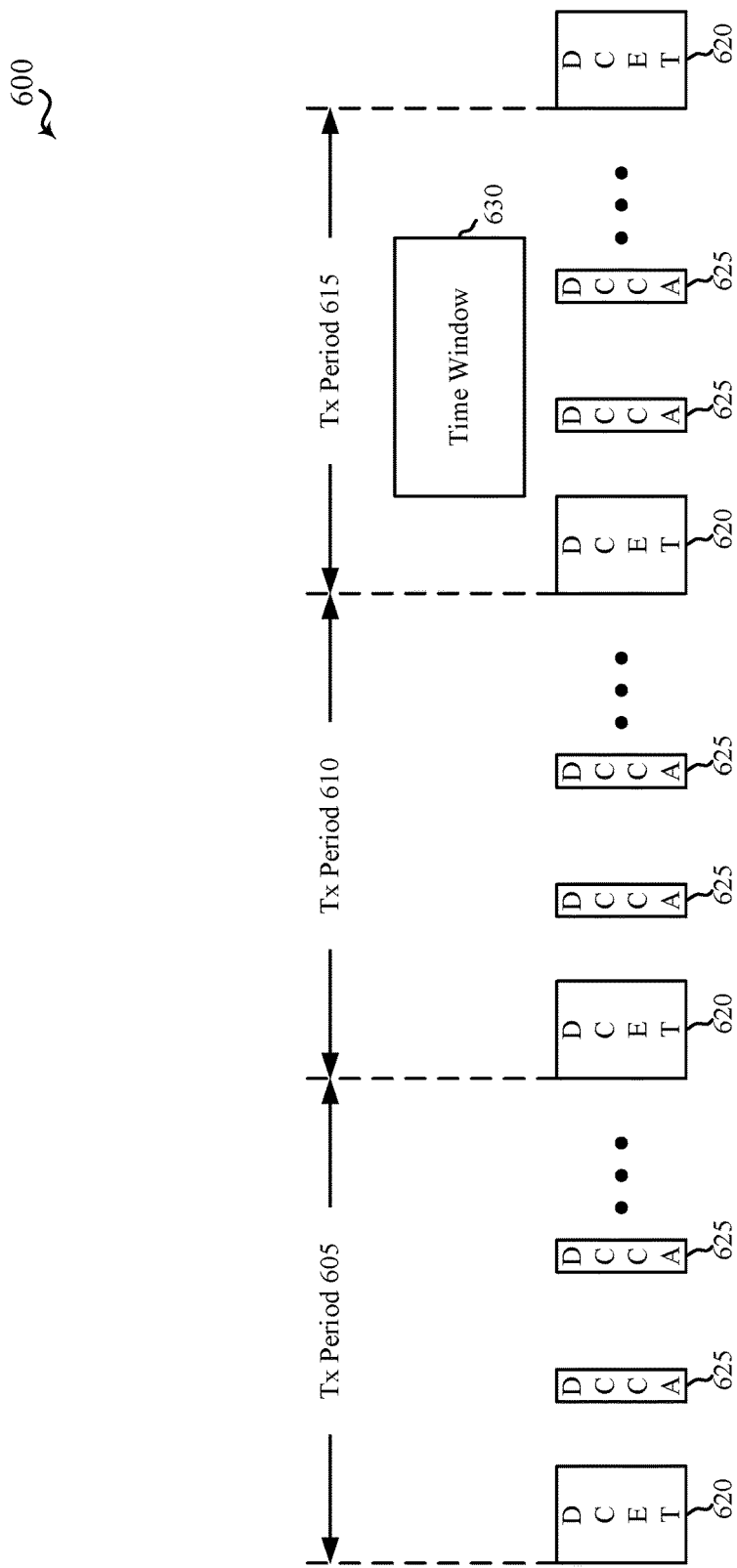
FIG. 6 shows an example of transmissions made by a base station over an unlicensed radio frequency spectrum band, in accordance with various aspects of the present disclosure.

FIG. 6 shows an example 600 of transmissions made by a base station over an unlicensed radio frequency spectrum band, in accordance with various aspects of the present disclosure. In some examples, the base station making the transmissions may be an example of aspects of one or more of the base stations 105, 205, and/or 205-a described with reference to FIG. 1 and/or 2.

By way of example, FIG. 6 illustrates transmissions made by a base station over time, in three adjacent transmission (Tx) periods. The three adjacent Tx periods include a first Tx period 605, a second Tx period 610, and a third Tx period 615. Transmissions made during the Tx periods may be a CET or a transmission subject to LBT.

The transmissions made by the base station may include synchronous transmissions made during downlink CETs (DCETs 620) of the base station, synchronous transmissions made during periodic fixed subframe locations (e.g., following successful DCCAs 625), and asynchronous transmissions made during a time window 630. Each of the DCETs 620 may be an example of one of the CETs described with reference to FIG. 5.

The time window 630 may be provided in each of the first Tx period 605, the second Tx period 610, and the third Tx period 615; once every N Tx periods (where N>1); or in one or more Tx periods on a dynamic basis. FIG. 6 shows the time window 630 occurring every N Tx periods and falling in the third Tx period 615. In some examples, multiple instances of the time window 630 may be provided in each of one or more Tx periods. The length or duration of the time window 630 may be shorter or longer than shown. In some examples, the time window 630 may overlap in time with at least one periodic fixed subframe location (e.g., at least one subframe following a DCCA 625). In some examples, the time window 630 may be associated with a different set of subcarrier frequencies of the unlicensed radio frequency spectrum band than the set of subcarrier frequencies included in a DCET 620, a DCCA 625, or a periodic fixed subframe following a DCCA 625.

In some examples, a paging group indicator and an indication of the time window 630 (e.g., an indication of when the time window 630 starts (e.g., a subframe number and/or OFDM symbol period number) and/or ends, an indication of the duration of the time window 630, and/or an indication of the frequency subcarriers included in the time window 630) may be transmitted by the base station in a DCET 620 (e.g., in the DCET 620 immediately preceding the time window 630). The paging group indicator and the indication of the time window 630 may in some examples be transmitted during a system information block (SIB), a master information block (MIB), and/or inside or outside the time window 630. In some examples, the paging group indicator and the indication of the time window 630 may be transmitted in an RRC message. In some examples, the DCET 620 in which the paging group indicator and the indication of the time window 630 are transmitted may include a plurality of paging group indicators and may signal different time windows for different ones of the plurality of paging indicators. In some examples, the paging group indicator may correspond to each UE connected to the base station. In some examples, the paging group indicator may correspond to a subset of UEs connected to the base station. In some examples, the time window 630 may include a period immediately following a DCET 620. In some examples, the time window 630 may overlap a DCET 620.

In some examples, at least a portion of a paging message associated with the paging group indicator may be transmitted by the base station during one or more of the DCETs 620, during one or more periodic fixed subframe locations (e.g., following one or more successful DCCAs 625), and/or during the time window 630. A transmission of a paging message during a DCET 620 or during a periodic fixed subframe may be considered a synchronous transmission, whereas a transmission of a paging message during the time window 630 may be considered an asynchronous transmission. A transmission of a paging message subject to CCA during a periodic fixed subframe location may also be considered an opportunistic transmission, because it may depend on the successful performance of a DCCA 625 preceding the periodic fixed subframe location.

When a paging message is transmitted during the time window 630, the paging message may be transmitted at a transmission time following one or more successful DCCAs performed during the time window 630. The DCCAs performed during the time window 630 may differ from the DCCAs 625. In some examples, a number of DCCAs may be performed during the time window 630, and a paging message may be transmitted at a transmission time that follows a first successful one of the DCCAs. In some examples, a number of DCCAs may be performed during the time window 630, and a paging message may be transmitted following a last unsuccessful one of the DCCAs performed during the time window, and/or at a transmission time occurring at an end of the time window 630. In some examples, the number of DCCAs may be configured, for example, based on power savings, observed channel interference, etc. In some examples, a DCCA may not be performed unless less than five percent of a channel bandwidth is occupied by a DCET 620 within a configurable period (e.g., 50 milliseconds (ms)).

A paging message transmitted during the time window 630 may be considered asynchronous for various reasons—e.g., because the paging message may be transmitted at a transmission time following one or multiple DCCAs, and/or because the start, end, or duration of the time window 630 may not be synchronized with a radio frame structure, LBT frame structure, and/or subframe structure to which the DCETs 620, the DCCAs 625, and/or the fixed periodic subframe locations following the DCCAs 625 are synchronized.

Following a transmission of a paging message, the base station may transmit an indication of an end of the paging message.

Figure 7:
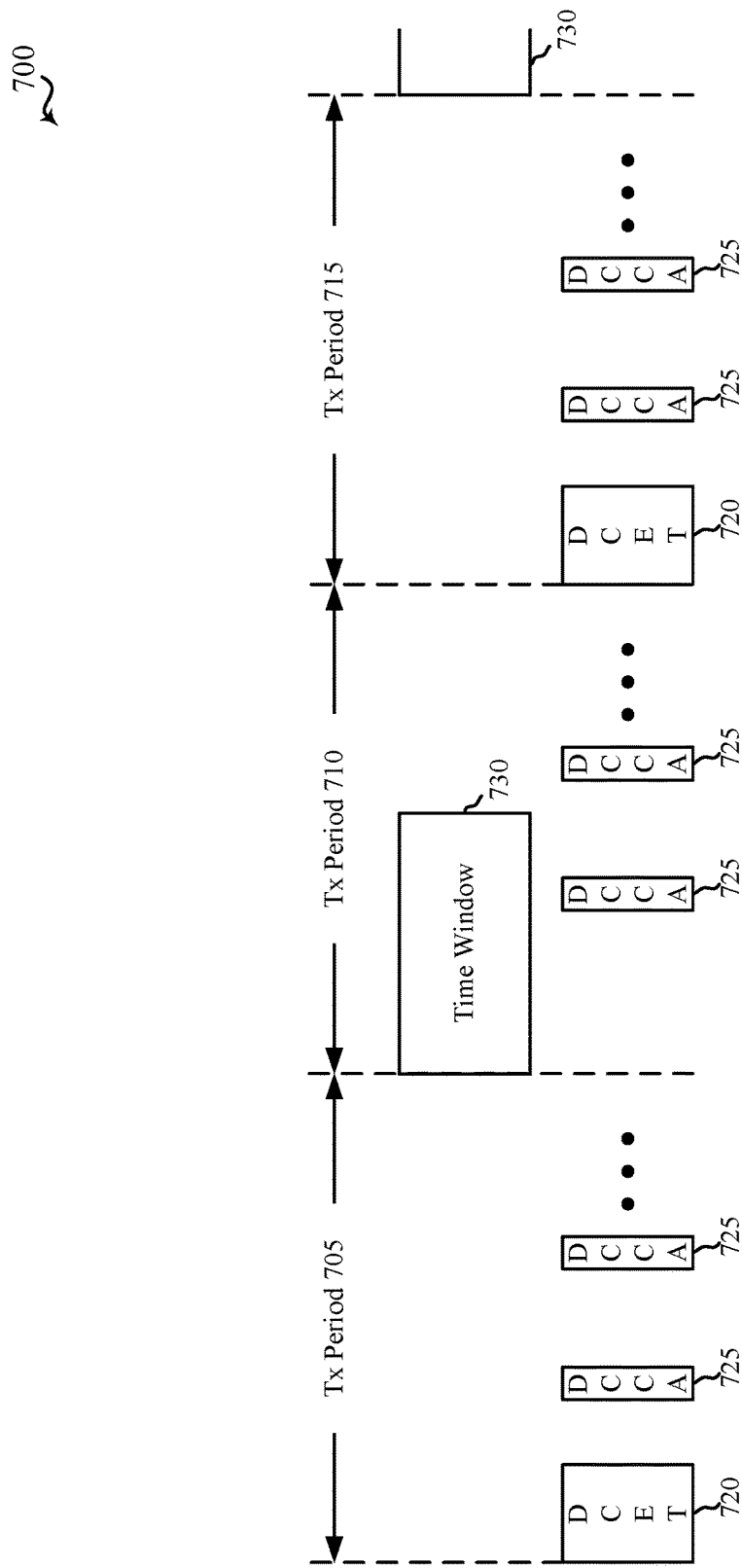
FIG. 7 shows an example of transmissions made by a base station over an unlicensed radio frequency spectrum band, in accordance with various aspects of the present disclosure.

FIG. 7 shows an example 700 of transmissions made by a base station over an unlicensed radio frequency spectrum band, in accordance with various aspects of the present disclosure. In some examples, the base station making the transmissions may be an example of aspects of one or more of the base stations 105, 205, and/or 205-a described with reference to FIG. 1 and/or 2.

By way of example, FIG. 7 illustrates transmissions made by a base station over time, in three adjacent transmission (Tx) periods. The three adjacent Tx periods include a first Tx period 705, a second Tx period 710, and a third Tx period 715. Transmissions made during the Tx periods may be a CET or a transmission subject to LBT.

The transmissions made by the base station may include synchronous transmissions made during downlink CETs (DCETs 720) of the base station, synchronous transmissions made during periodic fixed subframe locations (e.g., following successful DCCAs 725), and asynchronous transmissions made during a time window 730. Each of the DCETs 720 may be an example of one of the CETs described with reference to FIG. 5.

The time window 730 may be provided in each of the first Tx period 705, the second Tx period 710, and the third Tx period 715; once every N Tx periods (where N>1); or in one or more Tx periods on a dynamic basis. FIG. 7 shows the time window 730 occurring every N Tx periods, or on a dynamic basis, in the second Tx period 710. The length or duration of the time window 730 may be shorter or longer than shown. In some examples, the time window 730 may overlap in time with at least one periodic fixed subframe location (e.g., at least one subframe following a DCCA 725). In some examples, the time window 730 may be associated with a different set of subcarrier frequencies of the unlicensed radio frequency spectrum band than the set of subcarrier frequencies included in a DCET 720, a DCCA 725, or a periodic fixed subframe following a DCCA 725.

In some examples, a paging group indicator and an indication of the time window 730 (e.g., an indication of when the time window 730 starts (e.g., a subframe number and/or OFDM symbol period number) and/or ends, an indication of the duration of the time window 730, and/or an indication of the frequency subcarriers included in the time window 730) may be transmitted by the base station in a DCET 720 (e.g., in the DCET 720 immediately preceding the time window 730). The paging group indicator and indication of the time window 730 may in some examples be transmitted during a system information block (SIB), a master information block (MIB), and/or inside or outside the time window 730. In some examples, the indication of the time window 730 may be transmitted in an RRC message. In some examples, the DCET 720 in which the paging group indicator and the indication of the time window 730 are transmitted may include a plurality of paging group indicators and may signal different time windows for different ones of the plurality of paging indicators. In some examples, the paging group indicator may correspond to each UE connected to the base station. In some examples, the paging group indicator may correspond to a subset of UEs connected to the base station.

In some examples, at least a portion of a paging message associated with the paging group indicator may be transmitted by the base station during one or more of the DCETs 720, during one or more periodic fixed subframe locations (e.g., following one or more successful DCCAs 725), and/or during the time window 730. A transmission of a paging message during a DCET 720 or during a periodic fixed subframe may be considered a synchronous transmission, whereas a transmission of a paging message during the time window 730 may be considered an asynchronous transmission. A transmission of a paging message subject to CCA during a periodic fixed subframe location may also be considered an opportunistic transmission, because it may depend on the successful performance of a DCCA 725 preceding the periodic fixed subframe location.

In some examples, the base station may attempt to transmit a paging message at a transmission time coinciding with a DCET 720, but after the successful performance of a number of DCCAs instead of as a DCET. When a successful DCCA cannot be performed during the DCET 720, the base station may continue to perform DCCAs during the time window 730, and transmit the paging message upon the successful performance of a DCCA, or upon performing all of the number of DCCAs (e.g., all of the DCCAs during the time window 730) without success. The DCCAs performed during the time window 730 may differ from the DCCAs 725. In some examples, the number of DCCAs may be configured, for example, based on power savings, observed channel interference, etc. In some examples, a DCCA may not be performed unless less than five percent of a channel bandwidth is occupied by a DCET 620 within a configurable period (e.g., 50 milliseconds (ms)).

A paging message transmitted during the time window 730 may be considered asynchronous for various reasons— e.g., because the paging message may be transmitted at a transmission time following one or multiple DCCAs, and/or because the start, end, or duration of the time window 730 may not be synchronized with a radio frame structure, LBT frame structure, and/or subframe structure to which the DCETs 720, the DCCAs 725, and/or the fixed periodic subframe locations following the DCCAs 725 are synchronized.

Figure 8:
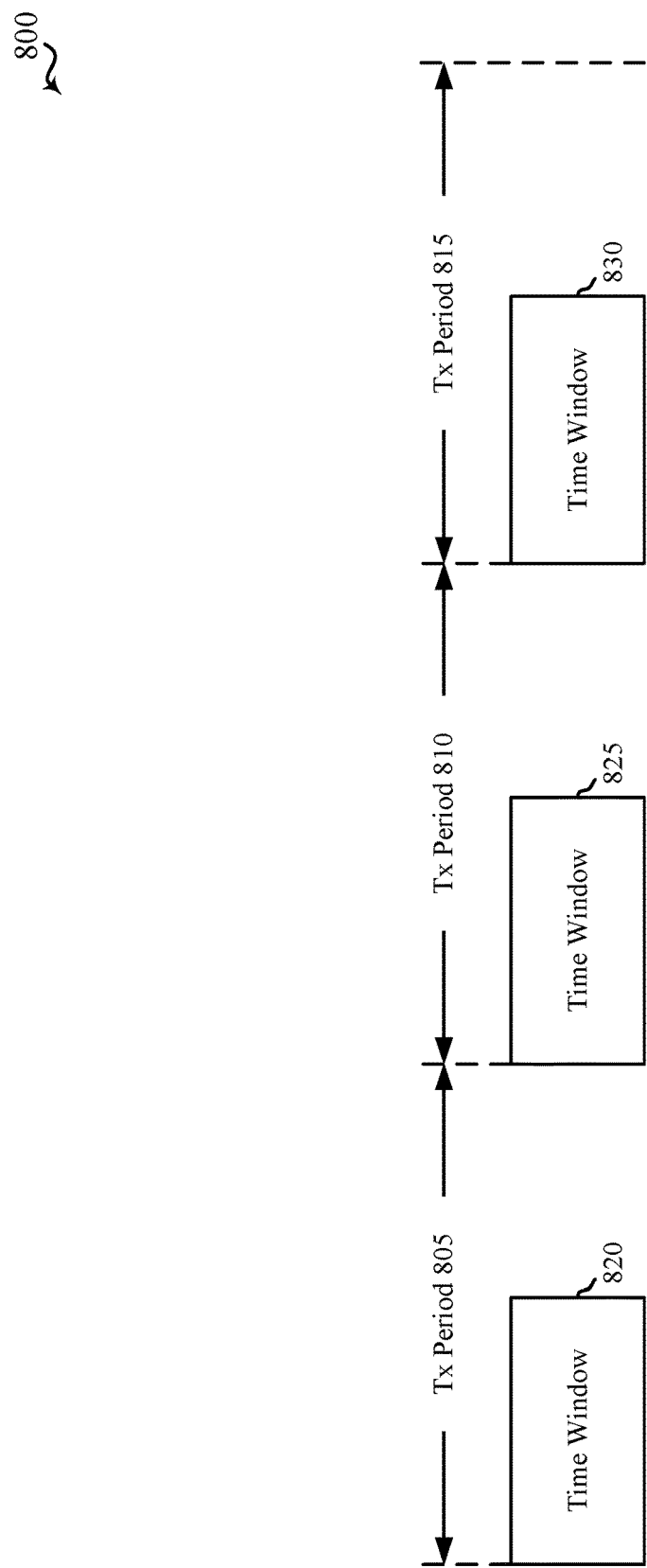
FIG. 8 shows an example of transmissions made by a base station over an unlicensed radio frequency spectrum band, in accordance with various aspects of the present disclosure.

FIG. 8 shows an example 800 of transmissions made by a base station over an unlicensed radio frequency spectrum band, in accordance with various aspects of the present disclosure. In some examples, the base station making the transmissions may be an example of aspects of one or more of the base stations 105, 205, and/or 205-*a* described with reference to FIG. 1 and/or 2.

By way of example, FIG. 8 illustrates transmissions made by a base station over time, in three adjacent transmission (Tx) periods. The three adjacent Tx periods include a first Tx period 805, a second Tx period 810, and a third Tx period 815. Transmissions made during the Tx periods may be a CET or a transmission subject to LBT.

The transmissions made by the base station may include asynchronous transmissions made during a first time window 820, a second time window 825, and a third time window 830. The length or duration of each of the first time window 820, the second time window 825, and the third time window 830 may be shorter or longer than shown.

In some examples, a paging group indicator and an indication of the first time window 820, the second time window 825, and/or the third time window 830 (e.g., an indication of when the time window starts (e.g., a subframe number and/or OFDM symbol period number) and/or ends, an indication of the duration of the time window, and/or an indication of the frequency subcarriers included in the time window) may be transmitted by the base station. Each paging group indicator and indication of a time window may in some examples be transmitted during a system information block (SIB), a master information block (MIB), and/or inside or outside the first time window 820, the second time window 825, and/or the third time window 830. In some examples, the paging group indicators and indications of the time windows may be transmitted in one or more RRC messages.

In some examples, the paging group indicator may correspond to each UE connected to the base station. In some examples, the paging group indicator may correspond to a subset of UEs connected to the base station. In some examples, a plurality of paging group indicators may be transmitted, and a same or different indication of a time window may be provided for each paging group indicator.

In some examples, a paging message may be transmitted by the base station during one or more of the first time window 820, the second time window 825, and/or the third time window 830. A transmission of a paging message during the first time window 820, the second time window 825, and/or the third time window 830 may be considered an asynchronous transmission.

When a paging message is transmitted during one or more of the first time window 820, the second time window 825, and/or the third time window 830, the paging message may be transmitted at a transmission time following one or more successful DCCAs performed during the time window. In some examples, a number of DCCAs may be performed during the time window, and a paging message may be transmitted at a transmission time that follows a first successful one of the DCCAs. In some examples, a number of DCCAs may be performed during the time window, and a paging message may be transmitted following a last unsuccessful one of the DCCAs performed during the time window, and/or at a transmission time occurring at an end of the time window. In some examples, the number of DCCAs may be configured, for example, based on power savings, observed channel interference, etc. In some examples, a DCCA may not be performed unless less than five percent of a channel bandwidth is occupied by a DCET within a configurable period (e.g., 50 milliseconds (ms)).

A paging message transmitted during the first time window 820, the second time window 825, and/or the third time window 830 may be considered asynchronous for various reasons—e.g., because the paging message may be transmitted at a transmission time following one or multiple DCCAs, and/or because the start, end, or duration of the time window may not be synchronized with a radio frame structure and/or LBT frame structure.

In some examples, system information may be transmitted over an unlicensed radio frequency spectrum band similar to how paging messages are transmitted over the unlicensed radio frequency spectrum band, as described with reference to FIG. 6, 7, and/or 8, and elsewhere in this description. However, a transmission of system information may not need to be preceded by a transmission of a paging group indicator.

Figure 9:
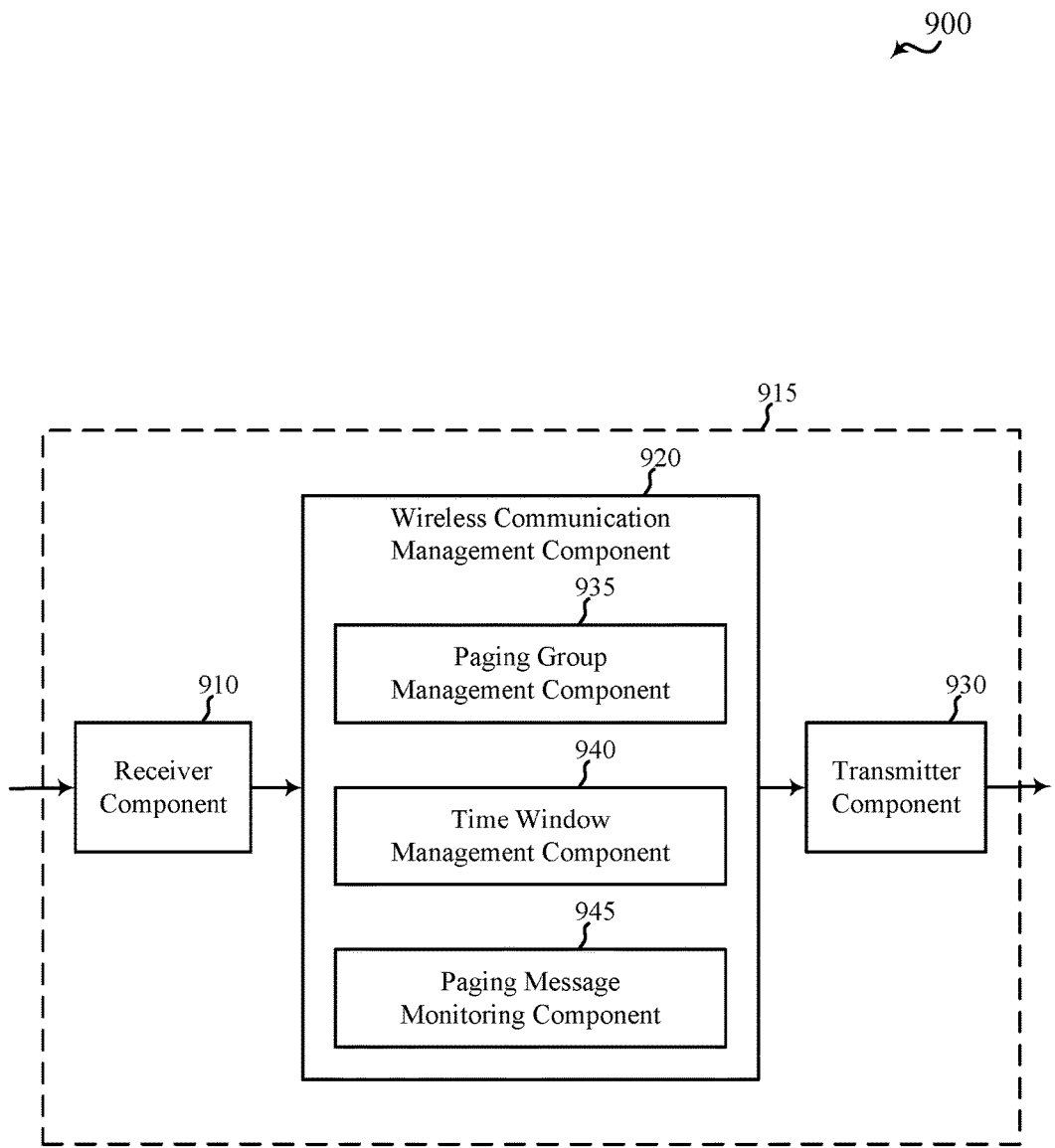
FIG. 9 shows a block diagram of an apparatus for use in wireless communication, in accordance with various aspects of the present disclosure.

FIG. 9 shows a block diagram 900 of an apparatus 915 for use in wireless communication, in accordance with various aspects of the present disclosure. The apparatus 915 may be an example of aspects of one or more of the UEs 115, 215, 215-*a*, 215-*b*, and/or 215-*c* described with reference to FIG. 1 and/or 2. The apparatus 915 may also be or include a processor. The apparatus 915 may include a receiver component 910, a wireless communication management component 920, and/or a transmitter component 930. Each of these components may be in communication with each other.

The components of the apparatus 915 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors. In some examples, the components as shown in FIG. 9 each may be executed in a dedicated hardware (e.g., a circuit or circuitry) for performing the functions described herein.

In some examples, the receiver component 910 may include at least one radio frequency (RF) receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIG. 1 and/or 2. The receiver component 910 may be used to receive various types of data and/or control signals (i.e., transmissions) over one or more communication links of a wireless communication system, such as one or more communication links of the wireless communication system 100 and/or 200 described with reference to FIG. 1 and/or 2. The communication links may be established over the licensed radio frequency spectrum band and/or the unlicensed radio frequency spectrum band.

In some examples, the transmitter component 930 may include at least one RF transmitter, such as at least one RF transmitter operable to transmit over the licensed radio frequency spectrum band and/or the unlicensed radio frequency spectrum band. The transmitter component 930 may be used to transmit various types of data and/or control signals (i.e., transmissions) over one or more communication links of a wireless communication system, such as one or more communication links of the wireless communication system 100 and/or 200 described with reference to FIG. 1 and/or 2. The communication links may be established over the licensed radio frequency spectrum band and/or the unlicensed radio frequency spectrum band.

In some examples, the wireless communication management component 920 may be used to manage one or more aspects of wireless communication for the apparatus 915. In some examples, the wireless communication management component 920 may be used to manage communications to and/or from a base station (e.g., a base station of an eNB). The communications may include transmissions associated with CETs or an LBT procedure. In some examples, the transmissions may include CETs received from a base station or transmissions received from a base station following an LBT procedure (e.g., following a successful CCA by the base station. The transmissions may be received during a predetermined time. For example, the transmissions may be received during a transmission period or a duration of an LBT radio frame. In some examples, the transmissions may be received over an unlicensed radio frequency spectrum band.

In some examples, the wireless communication management component 920 may include a paging group management component 935, a time window management compo-nent 940, and/or a paging message monitoring component 945. In some examples, the paging group management component 935 may be used to receive and/or process a paging group indicator included in a received transmission from a base station. In some examples, the time window management component 940 may be used to receive an indication of a time window included in the transmission and/or to manage the time window. In some examples, the paging group indicator and/or the indication of the time window may be received in a SIB and/or a MIB. In some examples, the paging group indicator and/or the indication of the time window may be received in an RRC message.

In some examples, the paging message monitoring component 945 may be used to monitor the unlicensed radio frequency spectrum band during the time window to receive an asynchronous paging message from a base station. The monitoring may be based on the paging group indicator.

Figure 10:
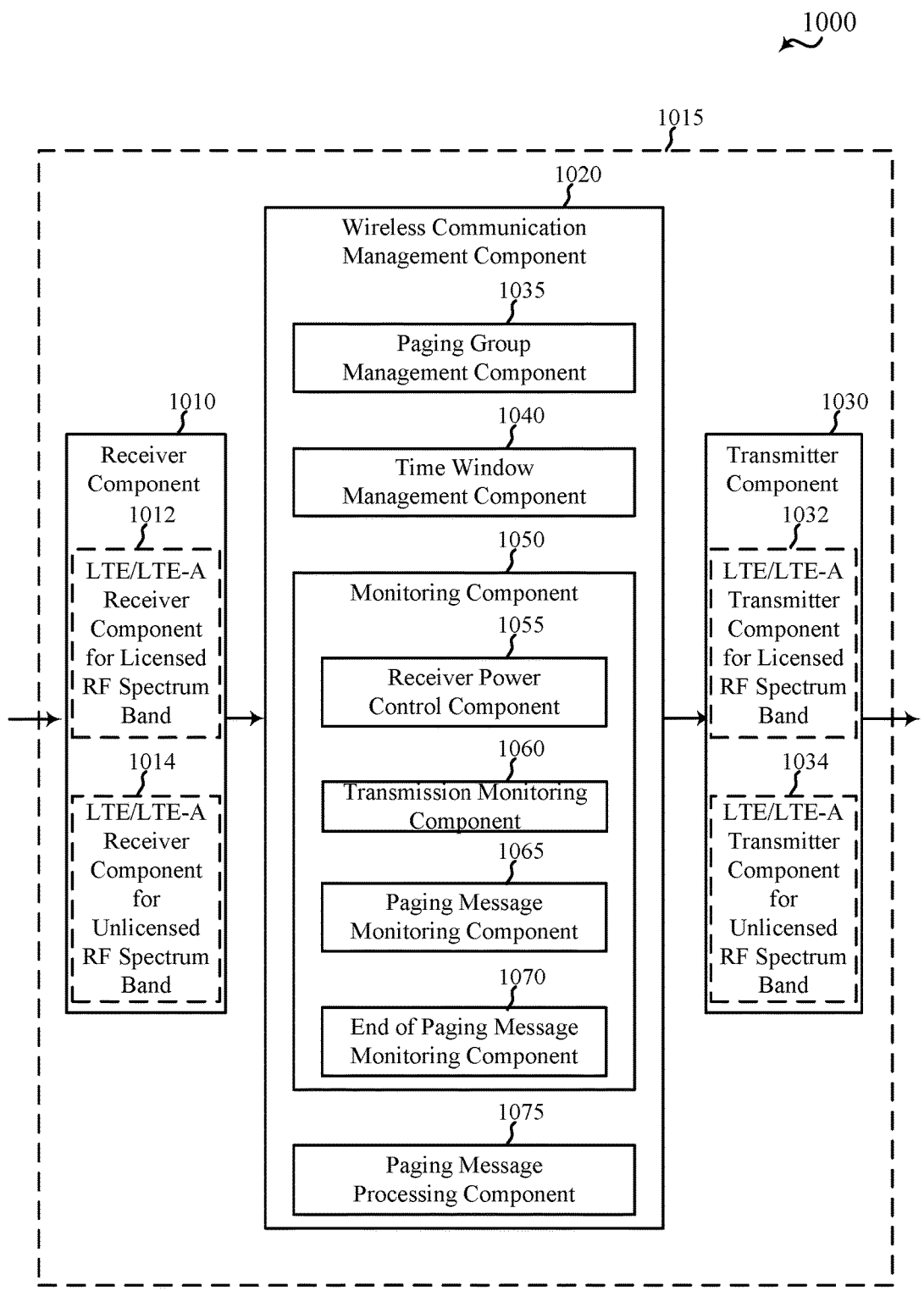
FIG. 10 shows a block diagram of an apparatus for use in wireless communication, in accordance with various aspects of the present disclosure.

FIG. 10 shows a block diagram 1000 of an apparatus 1015 for use in wireless communication, in accordance with various aspects of the present disclosure. The apparatus 1015 may be an example of aspects of one or more of the UEs 115, 215, 215-a, 215-b, and/or 215-c described with reference to FIG. 1 and/or 2, and/or an example of aspects of the apparatus 915 described with reference to FIG. 9. The apparatus 1015 may also be or include a processor. The apparatus 1015 may include a receiver component 1010, a wireless communication management component 1020, and/or a transmitter component 1030. Each of these components may be in communication with each other.

The components of the apparatus 1015 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. In some examples, the components as shown in FIG. 10 each may be executed in a dedicated hardware (e.g., a circuit or circuitry) for performing the functions described herein.

In some examples, the receiver component 1010 may include at least one radio RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIG. 1 and/or 2. The receiver component 1010 may in some cases include separate receivers for the licensed radio frequency spectrum band and the unlicensed radio frequency spectrum band. The separate receivers may, in some examples, take the form of an LTE/LTE-A receiver component for communicating over the licensed radio frequency spectrum band (e.g., LTE/LTE-A receiver component for licensed RF spectrum band 1012), and an LTE/LTE-A receiver component for communicating over the unlicensed radio frequency spectrum band (e.g., LTE/LTE-A receiver component for unlicensed RF spectrum band 1014). The receiver component 1010, including the LTE/LTE-A receiver component for licensed RF spectrum band 1012 and/or the LTE/LTE-A receiver component for unlicensed RF spectrum band 1014, may be used to receive various types of data and/or control signals (i.e., transmissions) over one or more communication links of a wireless communication system, such as one or more communication links of the wireless communication system 100 and/or 200 described with reference to FIG. 1 and/or 2. The communication links may be established over the licensed radio frequency spectrum band and/or the unlicensed radio frequency spectrum band.

In some examples, the transmitter component 1030 may include at least one RF transmitter, such as at least one RF transmitter operable to transmit over the licensed radio frequency spectrum band and/or the unlicensed radio frequency spectrum band. The transmitter component 1030 may in some cases include separate transmitters for the licensed radio frequency spectrum band and the unlicensed radio frequency spectrum band. The separate transmitters may, in some examples, take the form of an LTE/LTE-A transmitter component for communicating over the licensed radio frequency spectrum band (e.g., LTE/LTE-A transmitter component for licensed RF spectrum band 1032), and an LTE/LTE-A transmitter component for communicating over the unlicensed radio frequency spectrum band (e.g., LTE/LTE-A transmitter component for unlicensed RF spectrum band 1034). The transmitter component 1030, including the LTE/LTE-A transmitter component for licensed RF spectrum band 1032 and/or the LTE/LTE-A transmitter component for unlicensed RF spectrum band 1034, may be used to transmit various types of data and/or control signals (i.e., transmissions) over one or more communication links of a wireless communication system, such as one or more communication links of the wireless communication system 100 and/or 200 described with reference to FIG. 1 and/or 2. The communication links may be established over the licensed radio frequency spectrum band and/or the unlicensed radio frequency spectrum band.

In some examples, the wireless communication management component 1020 may be used to manage one or more aspects of wireless communication for the apparatus 1015. In some examples, the wireless communication management component 1020 may be used to manage communications to and/or from a base station (e.g., a base station of an eNB). In some examples, the wireless communication management component 1020 may include a paging group management component 1035, a time window management component 1040, a monitoring component 1050, and/or a paging message processing component 1075. In some examples, the monitoring component 1050 may be used to monitor various transmissions of the apparatus 1005. In some examples, the monitoring component 1050 may include a receiver power control component 1055, a transmission monitoring component 1060, a paging message monitoring component 1065, and/or an end of paging message monitoring component 1070.

In some examples, the transmission monitoring component 1060 may be used to receive a transmission over an unlicensed radio frequency spectrum band. In some examples, the transmission may include a paging group indicator and an indication of a time window. In some examples, the transmission may include a plurality of paging group indicators and may signal different time windows for different ones of the paging indicators. In some examples, the transmission may be received from a base station. In some examples, the transmission monitoring component 1060 may be used to receive the transmission during a predetermined time. The predetermined time may be associated with a CET or an LBT procedure.

In some examples, the paging group management component 1035 may be used to receive and/or process a paging group indicator included in a received transmission. In some examples, the paging group indicator may correspond to each UE connected to a base station. In some examples, the paging group indicator may correspond to a subset of UEs connected to the base station. In some examples, the paging group indicator may be received in a SIB and/or a MIB. In some examples, the paging group indicator may be received in an RRC message. In some examples, the paging group management component 1035 may be used to determine whether a received paging group indicator corresponds to a paging group associated with the apparatus 1015.

In some examples, the time window management component 1040 may be used to receive an indication of a time window included in the transmission and/or to manage the time window. In some examples, the indication of the time window may be received in a SIB and/or a MIB. In some examples, the indication of the time window may be received in an RRC message. In some examples, the time window may include a period immediately following a CET or an LBT procedure.

When it is determined by the paging group management component 1035 that a paging group indicator corresponds to a paging group associated with the apparatus 1015, the paging message monitoring component 1065 may be used to monitor the unlicensed radio frequency spectrum band during a time window managed by the time window management component 1040, to receive a paging message from a base station. The monitoring may be based on the paging group indicator.

In some examples, the monitoring performed by the paging message monitoring component 1065 may also or alternatively include monitoring the unlicensed radio frequency spectrum band during a periodic fixed subframe location.

In some examples, the paging message monitoring component 1065 and/or the paging message processing component 1075 may be used to receive a paging message from a base station. In some examples, the paging message may be an asynchronous paging message received during a time window managed by the time window management component 1040. In some examples, the transmission of the paging message may be a transmission subject to CCA, which transmission may be received during a periodic fixed subframe location. In some examples, a transmission in which an indication of a paging group indicator and an indication of a time window are received may include at least a portion of the paging message received by the paging message monitoring component 1065 and/or the paging message processing component 1075.

In some examples, a time window for which an indication is received may be associated with a different set of subcarrier frequencies of an unlicensed radio frequency spectrum band than a transmission of the paging message subject to CCA. In the same or alternative examples, the time window may overlap in time with the periodic fixed subframe location.

In some examples, the receiver power control component 1055 may be used to wake up a receiver of the receiver component 1010 (e.g., the LTE/LTE-A receiver component for unlicensed RF spectrum band 1014) from a sleep state prior to a time window managed by the time window management component 1040.

In some examples, the end of paging message monitoring component 1070 may be used to receive an indication of an end of the paging message from the base station.

Figure 11:
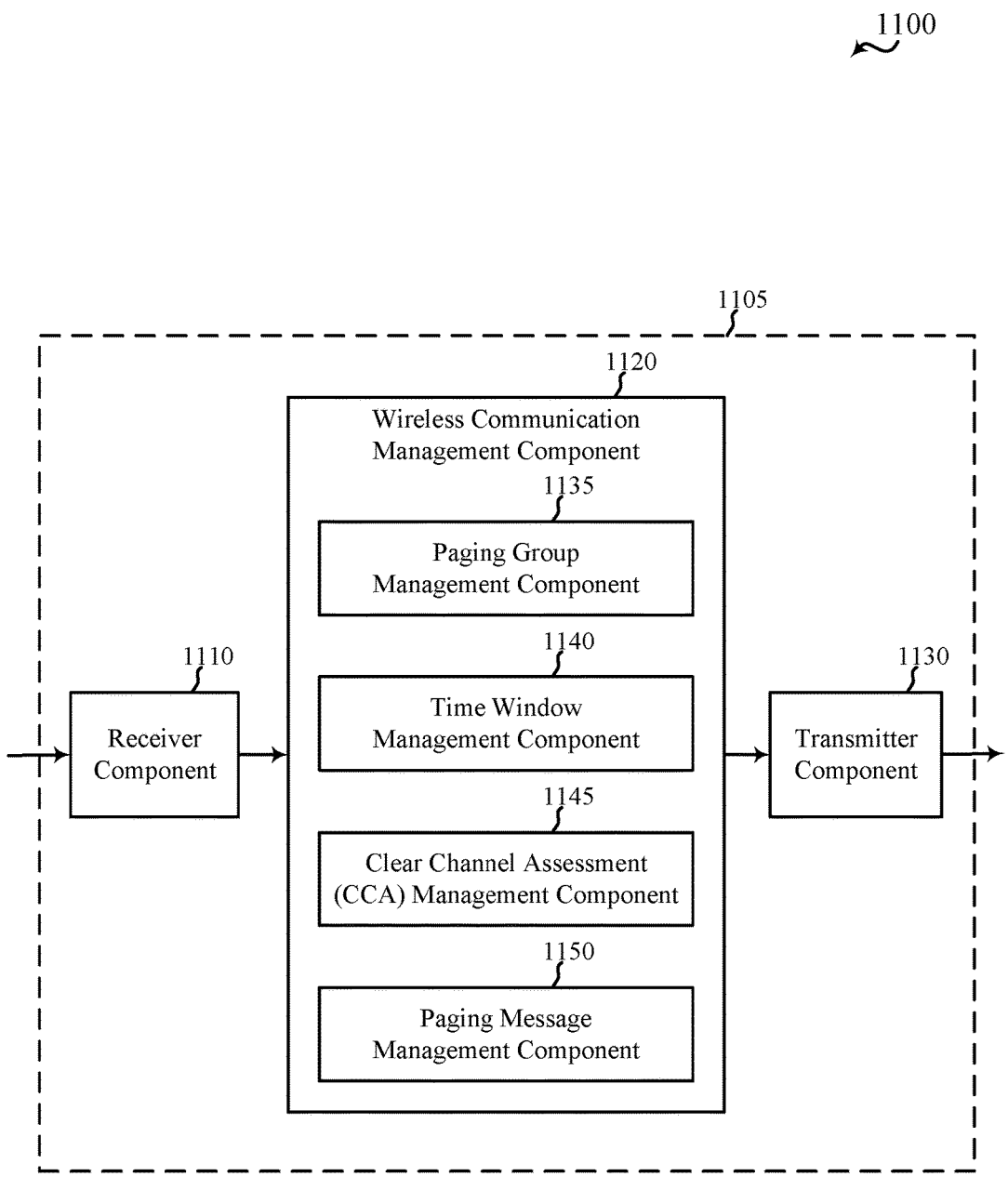
FIG. 11 shows a block diagram of an apparatus for use in wireless communication, in accordance with various aspects of the present disclosure.

FIG. 11 shows a block diagram 1100 of an apparatus 1105 for use in wireless communication, in accordance with various aspects of the present disclosure. The apparatus 1105 may be an example of aspects of one or more of the base stations 105, 205, and/or 205-*a* described with reference to FIG. 1 and/or 2. The apparatus 1105 may also be or include a processor. The apparatus 1105 may include a receiver component 1110, a wireless communication management component 1120, and/or a transmitter component 1130. Each of these components may be in communication with each other.

The components of the apparatus 1105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. In some examples, the components as shown in FIG. 11 each may be executed in a dedicated hardware (e.g., a circuit or circuitry) for performing the functions described herein.

In some examples, the receiver component 1110 may include at least one RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIG. 1 and/or 2. The receiver component 1110 may be used to receive various types of data and/or control signals (i.e., transmissions) over one or more communication links of a wireless communication system, such as one or more communication links of the wireless communication system 100 and/or 200 described with reference to FIG. 1 and/or 2. The communication links may be established over the licensed radio frequency spectrum band and/or the unlicensed radio frequency spectrum band.

In some examples, the transmitter component 1130 may include at least one RF transmitter, such as at least one RF transmitter operable to transmit over the licensed radio frequency spectrum band and/or the unlicensed radio frequency spectrum band. The transmitter component 1130 may be used to transmit various types of data and/or control signals (i.e., transmissions) over one or more communication links of a wireless communication system, such as one or more communication links of the wireless communication system 100 and/or 200 described with reference to FIG. 1 and/or 2. The communication links may be established over the licensed radio frequency spectrum band and/or the unlicensed radio frequency spectrum band.

In some examples, the wireless communication management component 1120 may be used to manage one or more aspects of wireless communication for the apparatus 1105. In some examples, the wireless communication management component 1120 may be used to manage communications to and/or from a number of UEs. The communications may include transmissions associated with CETs or an LBT procedure. In some examples, the transmissions may include CETs of the apparatus 1105. In other examples, the transmission may include transmission of the apparatus 1105 following an LBT procedure (e.g., following a successful CCA). In some examples, the transmissions may be received over an unlicensed radio frequency spectrum band.

In some examples, the wireless communication management component 1120 may include a paging group management component 1135, a time window management component 1140, a CCA management component 1145, and/or a paging message management component 1150. In some examples, the paging group management component 1135 may be used to format a transmission from the apparatus 1105 to include a paging group indicator. In some examples, the time window management component 1140 may be used to format a transmission from the apparatus 1105 to include an indication of a time window, and/or to manage the time window. In some examples, the paging group indicator and/or the indication of the time window may be transmitted in a SIB and/or a MIB. In some examples, the paging group indicator and/or the indication of the time window may be transmitted in an RRC message.

In some examples, the CCA management component 1145 may be used to perform a number of CCAs on an unlicensed radio frequency spectrum band, during a time window managed by the time window management component 1140. In some examples, the number of CCAs may include a single CCA. In some examples, the number of CCAs may include a plurality of CCAs.

In some examples, the paging message management component 1150 may be used to transmit a paging message associated with a paging group indicator. The paging message may be transmitted over an unlicensed radio frequency spectrum band at a transmission time during a time window. The transmission time may be based at least in part on a result of at least one of the CCAs performed by the CCA management component 1145.

Figure 12:
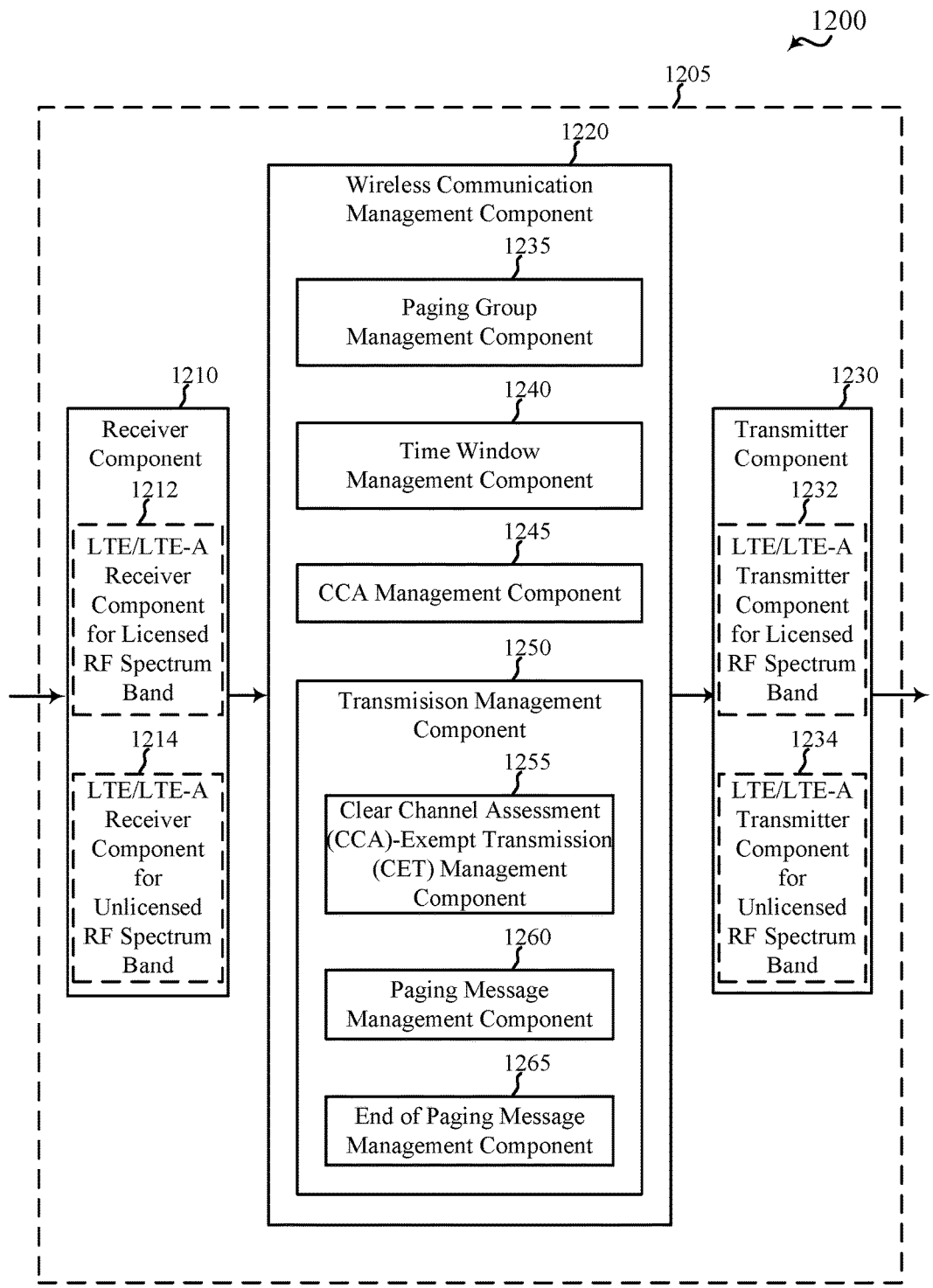
FIG. 12 shows a block diagram of an apparatus for use in wireless communication, in accordance with various aspects of the present disclosure.

FIG. 12 shows a block diagram 1200 of an apparatus 1205 for use in wireless communication, in accordance with various aspects of the present disclosure. The apparatus 1205 may be an example of aspects of one or more of the base stations 105, 205, and/or 205-*a* described with reference to FIG. 1 and/or 2, and/or an example of aspects of the apparatus 1105 described with reference to FIG. 11. The apparatus 1205 may also be or include a processor. The apparatus 1205 may include a receiver component 1210, a wireless communication management component 1220, and/or a transmitter component 1230. Each of these components may be in communication with each other.

The components of the apparatus 1205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. In some examples, the components as shown in FIG. 12 each may be executed in a dedicated hardware (e.g., a circuit or circuitry) for performing the functions described herein.

In some examples, the receiver component 1210 may include at least one radio RF receiver, such as at least one RF receiver operable to receive transmissions over a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIG. 1 and/or 2. The receiver component 1210 may in some cases include separate receivers for the licensed radio frequency spectrum band and the unlicensed radio frequency spectrum band. The separate receivers may, in some examples, take the form of an LTE/LTE-A receiver component for communicating over the licensed radio frequency spectrum band (e.g., LTE/LTE-A receiver component for licensed RF spectrum band 1212), and an LTE/LTE-A receiver component for communicating over the unlicensed radio frequency spectrum band (e.g., LTE/LTE-A receiver component for unlicensed RF spectrum band 1214). The receiver component 1210, including the LTE/LTE-A receiver component for licensed RF spectrum band 1212 and/or the LTE/LTE-A receiver component for unlicensed RF spectrum band 1214, may be used to receive various types of data and/or control signals (i.e., transmissions) over one or more communication links of a wireless communication system, such as one or more communication links of the wireless communication system 100 and/or 200 described with reference to FIG. 1 and/or 2. The communication links may be established over the licensed radio frequency spectrum band and/or the unlicensed radio frequency spectrum band.

In some examples, the transmitter component 1230 may include at least one RF transmitter, such as at least one RF transmitter operable to transmit over the licensed radio frequency spectrum band and/or the unlicensed radio frequency spectrum band. The transmitter component 1230 may in some cases include separate transmitters for the licensed radio frequency spectrum band and the unlicensed radio frequency spectrum band. The separate transmitters may, in some examples, take the form of an LTE/LTE-A transmitter component for communicating over the licensed radio frequency spectrum band (e.g., LTE/LTE-A transmitter component for licensed RF spectrum band 1232), and an LTE/LTE-A transmitter component for communicating over the unlicensed radio frequency spectrum band (e.g., LTE/LTE-A transmitter component for unlicensed RF spectrum band 1234). The transmitter component 1230, including the LTE/LTE-A transmitter component for licensed RF spectrum band 1232 and/or the LTE/LTE-A transmitter component for unlicensed RF spectrum band 1234, may be used to transmit various types of data and/or control signals (i.e., transmissions) over one or more communication links of a wireless communication system, such as one or more communication links of the wireless communication system 100 and/or 200 described with reference to FIG. 1 and/or 2. The communication links may be established over the licensed radio frequency spectrum band and/or the unlicensed radio frequency spectrum band.

In some examples, the wireless communication management component 1220 may be used to manage one or more aspects of wireless communication for the apparatus 1205. In some examples, the wireless communication management component 1220 may be used to manage communications to and/or from a number of UEs. In some examples, the wireless communication management component 1220 may include a paging group management component 1235, a time window management component 1240, a CCA management component 1245, and/or a transmission management component 1250. In some examples, the transmission management component 1250 may be used to manage various transmissions of the apparatus 1205. In some examples, the transmission management component 1250 may include a CET management component 1255, a paging message management component 1260, and/or an end of paging message management component 1265.

In some examples, the CET management component 1255 may be used to transmit a CET over an unlicensed radio frequency spectrum band. In some examples, the CET may include a paging group indicator and an indication of a time window. In some examples, the CET may include a plurality of paging group indicators and may signal different time windows for different ones of the plurality of paging indicators. In some examples, the CET may be transmitted to one or more UEs.

In some examples, the paging group management component 1235 may be used to format a CET to include a paging group indicator. In some examples, the paging group indicator may correspond to each UE connected to the apparatus 1205. In some examples, the paging group indicator may correspond to a subset of UEs connected to the apparatus 1205. In some examples, the paging group indicator may be transmitted in a SIB and/or a MIB. In some examples, the paging group indicator may be transmitted in an RRC message.

In some examples, the time window management component 1240 may be used to format a transmission from the apparatus 1205 to include an indication of a time window, and/or to manage the time window. In some examples, the paging group indicator and/or the indication of the time window may be transmitted in a SIB and/or a MIB. In some examples, the paging group indicator and/or the indication of the time window may be transmitted in an RRC message. In some examples, the time window may include a period immediately following the transmission.

In some examples, the CCA management component 1245 may be used to perform a number of CCAs on an unlicensed radio frequency spectrum band, during a time window managed by the time window management component 1240. In some examples, the number of CCAs may include a single CCA. In some examples, the number of CCAs may include a plurality of CCAs. In some examples, the CCA management component 1245 may be used to transmit a signal (i.e., a transmission) including a paging group indicator and an indication of a time window during a predetermined time (e.g., a duration of an LBT radio frame) over an unlicensed radio frequency spectrum band.

In some examples, the paging message management component 1260 may be used to transmit a paging message associated with a paging group indicator. The paging message may be transmitted over an unlicensed radio frequency spectrum band at a transmission time during a time window. The transmission time may be based at least in part on a result of at least one of the CCAs performed by the CCA management component 1245. In some examples, the CCA management component 1245 may identify a first successful one of the CCAs performed by the CCA management component 1245 during a time window, and the transmission time may follow the first successful one of the CCAs. In some examples, the CCA management component 1245 may determine that none of the CCAs performed by the CCA management component 1245 during a time window was successful, and the transmission time may follow the performance of a last unsuccessful one of the number of CCAs during the time window, or the transmission time may occur at an end of the time window.

In some examples, a transmission in which an indication of a paging group indicator and an indication of a time window are transmitted may include at least a portion of the paging message transmitted by the paging message management component 1260.

In some examples, the paging message management component 1260 may be used to transmit a paging message over the unlicensed radio frequency spectrum band opportunistically, during a periodic fixed subframe location (e.g., following the successful performance of a CCA during a periodic LBT radio frame). In some examples, a time window for which an indication is transmitted by the apparatus 1215 may be associated with a different set of subcarrier frequencies of an unlicensed radio frequency spectrum band than a transmission of the paging message subject to CCA. In the same or alternative examples, the time window may overlap in time with the periodic fixed subframe location.

In some examples, the end of paging message management component 1265 may be used to transmit an indication of an end of the paging message from the apparatus 1205.

Figure 13:
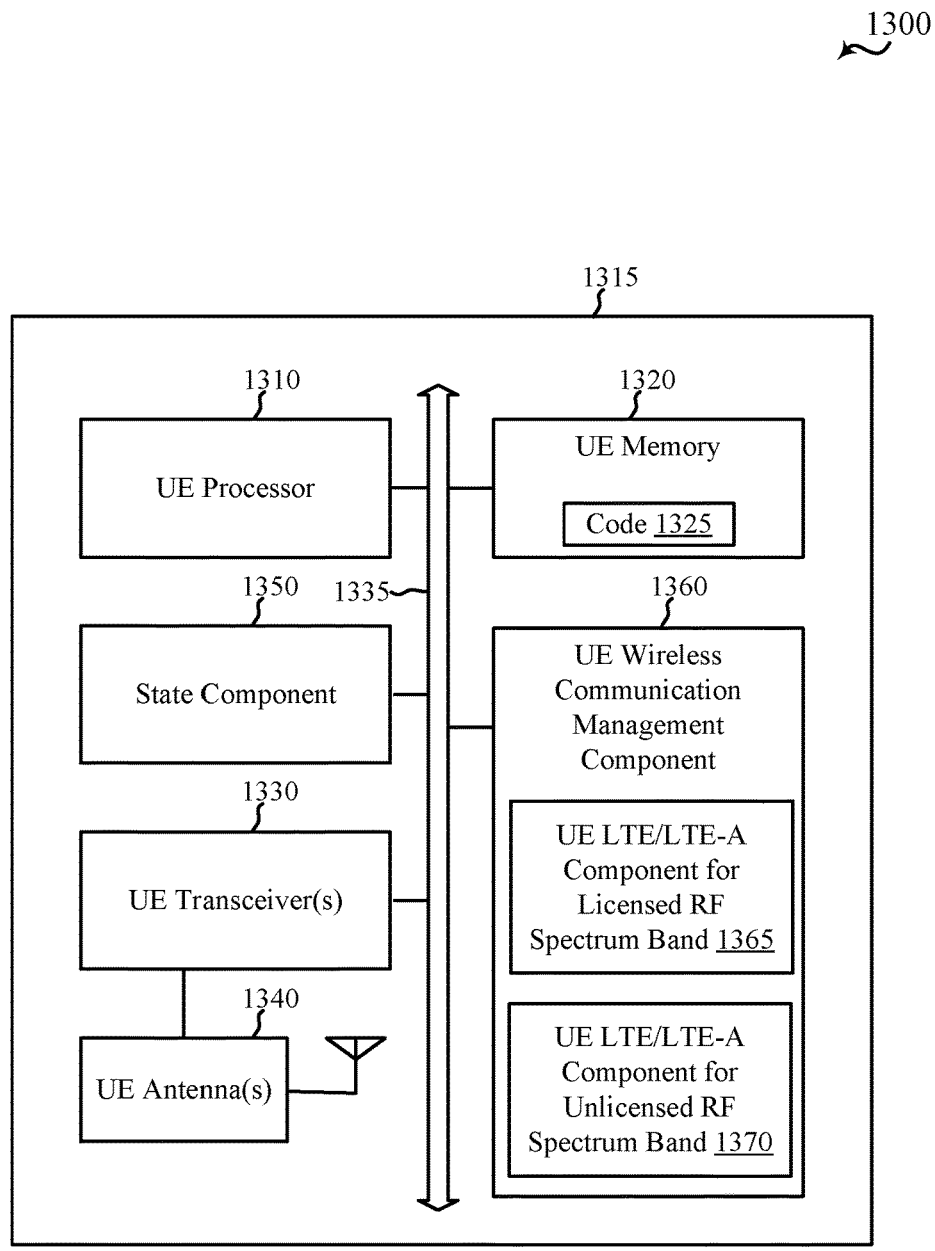
FIG. 13 shows a block diagram of a user equipment (UE) for use in wireless communication, in accordance with various aspects of the present disclosure.

FIG. 13 shows a block diagram 1300 of a UE 1315 for use in wireless communication, in accordance with various aspects of the present disclosure. The UE 1315 may have various configurations and may be included or be part of a personal computer (e.g., a laptop computer, a netbook computer, a tablet computer, etc.), a cellular telephone (e.g., a smart phone), a PDA, a digital video recorder (DVR), an internet appliance, a gaming console, an e-reader, etc. The UE 1315 may, in some examples, have an internal power supply (not shown), such as a small battery, to facilitate mobile operation. In some examples, the UE 1315 may be an example of aspects of one or more of the UE 115, 215, 215-a, 215-b, and/or 215-c described with reference to FIG. 1 and/or 2, and/or aspects of one or more of the apparatuses 915 and/or 1015 described with reference to FIG. 9 and/or 10. The UE 1315 may be configured to implement at least some of the UE and/or apparatus features and functions described with reference to FIG. 1, 2, 3, 4, 5, 6, 7, 8, 9, and/or 10.

The UE 1315 may include a UE processor 1310, a UE memory 1320, at least one UE transceiver (represented by UE transceiver(s) 1330), at least one UE antenna (represented by UE antenna(s) 1340), and/or a UE wireless communication management component 1360. Each of these components may be in communication with each other, directly or indirectly, over one or more buses 1335.

The UE memory 1320 may include random access memory (RAM) and/or read-only memory (ROM). The UE memory 1320 may store computer-readable, computer-executable code 1325 containing instructions that are configured to, when executed, cause the UE processor 1310 to perform various functions described herein related to wireless communication, including the monitoring of an unlicensed radio frequency spectrum band to receive paging messages from a base station (e.g., from one of the base stations 105, 205, and/or 205-a described with reference to FIG. 1 and/or 2). Alternatively, the computer-executable code 1325 may not be directly executable by the UE processor 1310 but be configured to cause the UE 1315 (e.g., when compiled and executed) to perform various of the functions described herein.

The UE processor 1310 may include an intelligent hardware device, e.g., a central processing unit (CPU), a microcontroller, an ASIC, etc. The UE processor 1310 may process information received through the UE transceiver(s) 1330 and/or information to be sent to the UE transceiver(s) 1330 for transmission through the UE antenna(s) 1340. The UE processor 1310 may handle, alone or in connection with the UE wireless communication management component 1360, various aspects of communicating over (or managing communications over) a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use).

The UE transceiver(s) 1330 may include a modem configured to modulate packets and provide the modulated packets to the UE antenna(s) 1340 for transmission, and to demodulate packets received from the UE antenna(s) 1340. The UE transceiver(s) 1330 may, in some examples, be implemented as one or more UE transmitters and one or more separate UE receivers. The UE transceiver(s) 1330 may support communications in the licensed radio frequency spectrum band and/or the unlicensed radio frequency spectrum band. The UE transceiver(s) 1330 may be configured to communicate bi-directionally, via the UE antenna(s) 1340, with one or more base stations. While the UE 1315 may include a single UE antenna, there may be examples in which the UE 1315 may include multiple UE antennas 1340.

The UE state component 1350 may be used, for example, to manage transitions of the UE 1315 between an RRC idle state and an RRC connected state, and may be in communication with other components of the UE 1315, directly or indirectly, over the one or more buses 1335. The UE state component 1350, or portions of it, may include a processor, and/or some or all of the functions of the UE state component 1350 may be performed by the UE processor 1310 and/or in connection with the UE processor 1310.

The UE wireless communication management component 1360 may be configured to perform and/or control some or all of the UE and/or apparatus features and functions described with reference to FIG. 1, 2, 3, 4, 5, 6, 7, 8, 9, and/or 10 related to wireless communication over a licensed radio frequency spectrum band and/or an unlicensed radio frequency spectrum band. For example, the UE wireless communication management component 1360 may be configured to support a supplemental downlink mode, a carrier aggregation mode, and/or a standalone mode using the licensed radio frequency spectrum band and/or the unlicensed radio frequency spectrum band. The UE wireless communication management component 1360 may include a UE LTE/LTE-A component for licensed RF spectrum band 1365 configured to handle LTE/LTE-A communications in the licensed radio frequency spectrum band, and a UE LTE/LTE-A component for unlicensed RF spectrum band 1370 configured to handle LTE/LTE-A communications in the unlicensed radio frequency spectrum band. The UE wireless communication management component 1360, or portions of it, may include a processor, and/or some or all of the functions of the UE wireless communication management component 1360 may be performed by the UE processor 1310 and/or in connection with the UE processor 1310. In some examples, the UE wireless communication management component 1360 may be an example of the wireless communication management component 920 and/or 1020 described with reference to FIG. 9 and/or 10.

Figure 14:
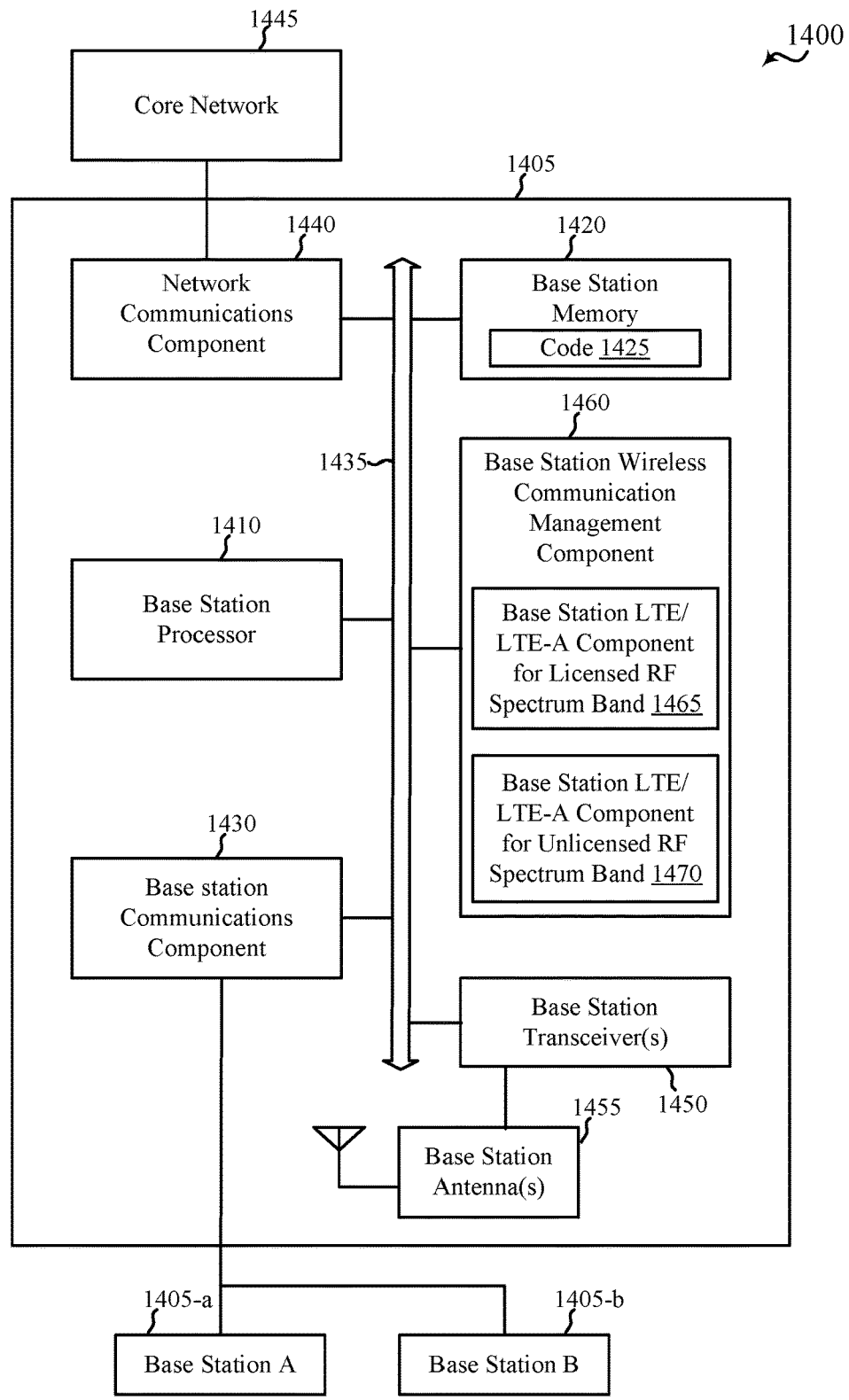
FIG. 14 shows a block diagram of a base station (e.g., a base station forming part or all of an eNodeB (eNB)) for use in wireless communication, in accordance with various aspects of the present disclosure.

FIG. 14 shows a block diagram 1400 of a base station 1405 (e.g., a base station forming part or all of an eNB) for use in wireless communication, in accordance with various aspects of the present disclosure. In some examples, the base station 1405 may be an example of aspects of one or more of the base stations 105, 205, and/or 205-*a* described with reference to FIG. 1 and/or 2, and/or aspects of one or more of the apparatuses 1105 and/or 1205 described with reference to FIG. 11 and/or 12. The base station 1405 may be configured to implement or facilitate at least some of the base station, transmitting apparatus, and/or receiving apparatus features and functions described with reference to FIG. 1, 2, 3, 4, 5, 6, 7, 8, 11, and/or 12.

The base station 1405 may include a base station processor 1410, a base station memory 1420, at least one base station transceiver (represented by base station transceiver(s) 1450), at least one base station antenna (represented by base station antenna(s) 1455), and/or a base station wireless communication management component 1460. The base station 1405 may also include one or more of a base station communications component 1430 and/or a network communications component 1440. Each of these components may be in communication with each other, directly or indirectly, over one or more buses 1435.

The base station memory 1420 may include RAM and/or ROM. The base station memory 1420 may store computer-readable, computer-executable code 1425 containing instructions that are configured to, when executed, cause the base station processor 1410 to perform various functions described herein related to wireless communication, including the transmission of a timing window, a paging group indicator, and/or a paging message. Alternatively, the computer-executable code 1425 may not be directly executable by the base station processor 1410 but be configured to cause the base station 1405 (e.g., when compiled and executed) to perform various of the functions described herein.

The base station processor 1410 may include an intelligent hardware device, e.g., a CPU, a microcontroller, an ASIC, etc. The base station processor 1410 may process information received through the base station transceiver(s) 1450, the base station communications component 1430, and/or the network communications component 1440. The base station processor 1410 may also process information to be sent to the transceiver(s) 1450 for transmission through the antenna(s) 1455, to the base station communications component 1430, for transmission to one or more other base stations 1405-*a* and 1405-*b*, and/or to the network communications component 1440 for transmission to a core network 1445, which may be an example of one or more aspects of the core network 130 described with reference to FIG. 1. The base station processor 1410 may handle, alone or in connection with the base station wireless communication management component 1460, various aspects of communicating over (or managing communications over) a licensed radio frequency spectrum band (e.g., a radio frequency spectrum band for which transmitting apparatuses may not contend for access because the radio frequency spectrum band is licensed to particular users for particular uses, such as a licensed radio frequency spectrum band usable for LTE/LTE-A communications) and/or an unlicensed radio frequency spectrum band (e.g., a radio frequency spectrum band for which transmitting apparatuses may contend for access because the radio frequency spectrum band is available for unlicensed use, such as Wi-Fi use).

The base station transceiver(s) 1450 may include a modem configured to modulate packets and provide the modulated packets to the base station antenna(s) 1455 for transmission, and to demodulate packets received from the base station antenna(s) 1455. The base station transceiver(s) 1450 may, in some examples, be implemented as one or more base station transmitters and one or more separate base station receivers. The base station transceiver(s) 1450 may support communications in the licensed radio frequency spectrum band and/or the unlicensed radio frequency spectrum band. The base station transceiver(s) 1450 may be configured to communicate bi-directionally, via the antenna(s) 1455, with one or more UEs, such as one or more of the UEs 115, 215-*a*, 215-*b*, 215-*c*, and/or 1515 described with reference to FIG. 1, 2, and/or 15. The base station 1405 may, for example, include multiple base station antennas 1455 (e.g., an antenna array). The base station 1405 may communicate with the core network 1445 through the network communications component 1440. The base station 1405 may also communicate with other base stations, such as the base stations 1405-*a* and 1405-*b*, using the base station communications component 1430.

The base station wireless communication management component 1460 may be configured to perform and/or control some or all of the base station and/or apparatus features and functions described with reference to FIG. 1, 2, 3, 4, 5, 6, 7, 8, 11, and/or 12 related to wireless communication over a licensed radio frequency spectrum band and/or an unlicensed radio frequency spectrum band. For example, the base station wireless communication management component 1460 may be configured to support a supplemental downlink mode, a carrier aggregation mode, and/or a standalone mode using the licensed radio frequency spectrum band and/or the unlicensed radio frequency spectrum band. The base station wireless communication management component 1460 may include a base station LTE/LTE-A component for licensed RF spectrum band 1465 configured to handle LTE/LTE-A communications in the licensed radio frequency spectrum band, and a base station LTE/LTE-A component for unlicensed RF spectrum band 1470 configured to handle LTE/LTE-A communications in the unlicensed radio frequency spectrum band. The base station wireless communication management component 1460, or portions of it, may include a processor, and/or some or all of the functions of the base station wireless communication management component 1460 may be performed by the base station processor 1410 and/or in connection with the base station processor 1410. In some examples, the base station wireless communication management component 1460 may be an example of the wireless communication management component 1120 and/or 1220 described with reference to FIG. 11 and/or 12.

Figure 15:
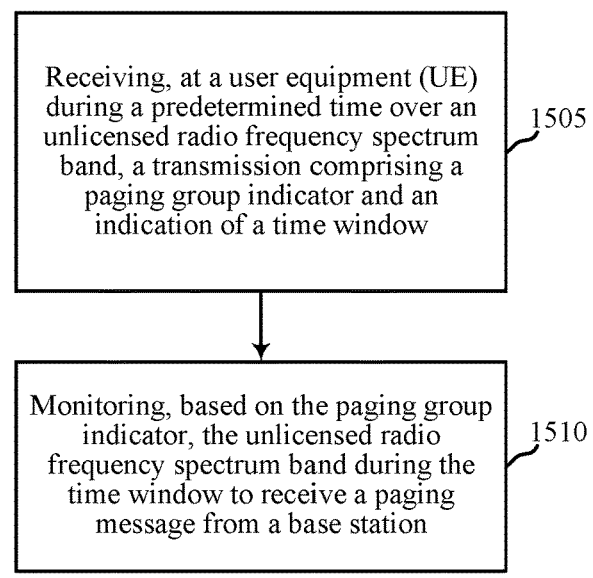
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115, 215, 215-a, 215-b, 215-c, and/or 1315 described with reference to FIG. 1, 2, and/or 13, and/or aspects of one or more of the apparatuses 915 and/or 1015 described with reference to FIG. 9 and/or 10. In some examples, a UE or an apparatus may execute one or more sets of codes to control the functional elements of the UE or apparatus to perform the functions described below. Additionally or alternatively, the UE or apparatus may perform one or more of the functions described below using special-purpose hardware.

At block 1505, the method 1500 may include receiving at a UE during a predetermined time a transmission including a paging group indicator and an indication of a time window. The transmission may be received at the UE over an unlicensed radio frequency spectrum band. In some examples, the unlicensed radio frequency spectrum band may include a radio frequency spectrum band for which apparatuses may contend for access because the radio frequency spectrum band is available for unlicensed use, such as Wi-Fi use. In some examples, the paging group indicator and/or the indication of the time window may be received in a SIB and/or a MIB. In some examples, the paging group indicator and/or the indication of the time window may be received in an RRC message. In some examples, the predetermined time may be associated with a CET or an LBT procedure. For example, the transmission may be received during a transmission period or a duration of an LBT radio frame. The operation(s) at block 1505 may be performed using the wireless communication management component 920, 1020, and/or 1360 described with reference to FIG. 9, 10, and/or 13, the paging group management component 935 and/or 1035 and/or the time window management component 940 and/or 1040 described with reference to FIG. 9 and/or 10, and/or the transmission monitoring component 1060 described with reference to FIG. 10.

At block 1510, the method 1500 may include monitoring the unlicensed radio frequency spectrum band during the time window to receive a paging message from a base station (e.g., a base station of an eNB). The monitoring may be based on the paging group indicator. The operation(s) at block 1510 may be performed using the wireless communication management component 920, 1020, and/or 1360 described with reference to FIG. 9, 10, and/or 13, the paging message monitoring component 945 and/or 1065 described with reference to FIG. 9 and/or 10, and/or the monitoring component 1050 described with reference to FIG. 10.

Thus, the method 1500 may provide for wireless communication. It should be noted that the method 1500 is just one implementation and that the operations of the method 1500 may be rearranged or otherwise modified such that other implementations are possible.

Figure 16:
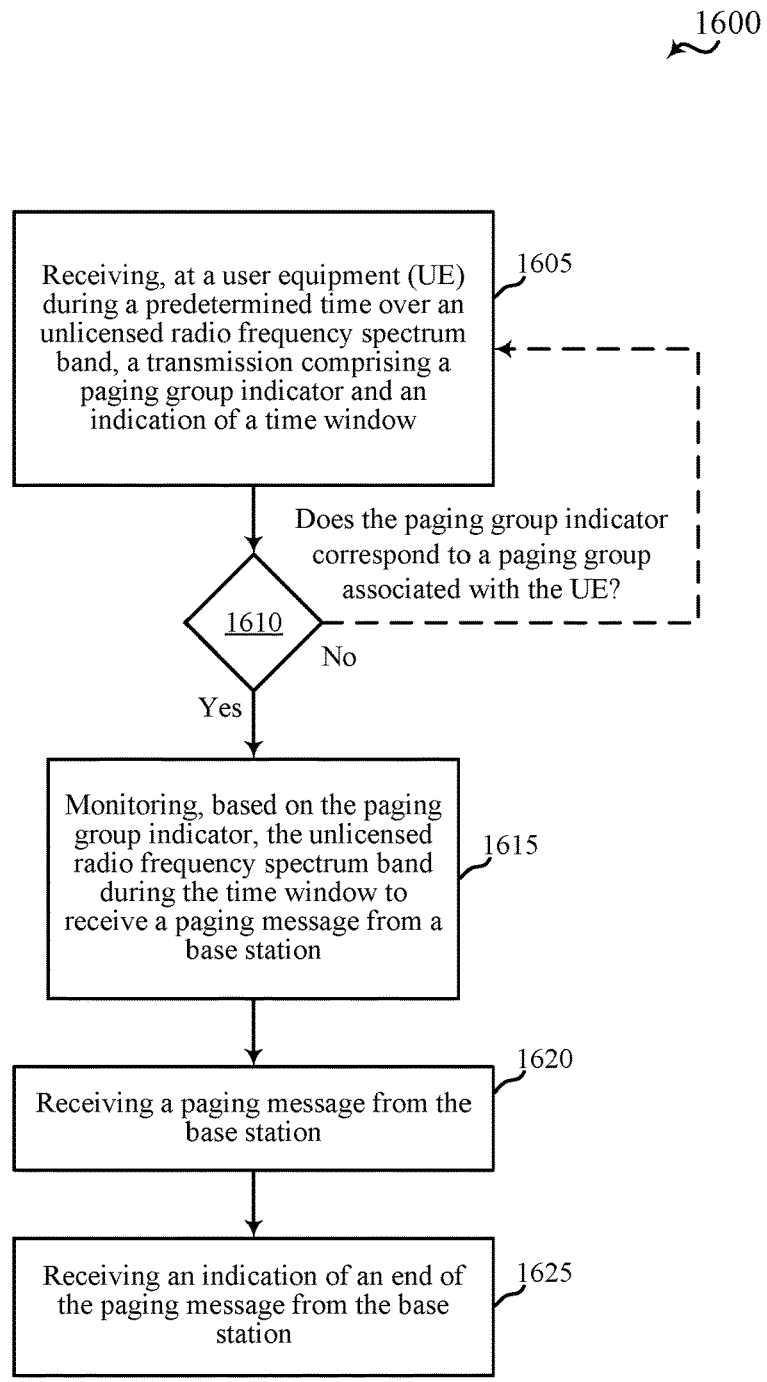
FIG. 16 is a flow chart illustrating an example of a method for wireless communication, in accordance with various aspects of the present disclosure

FIG. 16 is a flow chart illustrating an example of a method 1600 for wireless communication, in accordance with various aspects of the present disclosure. For clarity, the method 1600 is described below with reference to aspects of one or more of the UEs 115, 215, 215-a, 215-b, 215-c, and/or 1315 described with reference to FIG. 1, 2, and/or 13, and/or aspects of one or more of the apparatuses 915 and/or 1015 described with reference to FIG. 9 and/or 10. In some examples, a UE or an apparatus may execute one or more sets of codes to control the functional elements of the UE or apparatus to perform the functions described below. Additionally or alternatively, the UE or apparatus may perform one or more of the functions described below using special-purpose hardware.

At block 1605, the method 1600 may include receiving at a UE during a predetermined time a transmission including a paging group indicator and an indication of a time window. The transmission may be received at the UE over an unlicensed radio frequency spectrum band. In some examples, the unlicensed radio frequency spectrum band may include a radio frequency spectrum band for which apparatuses may contend for access because the radio frequency spectrum band is available for unlicensed use, such as Wi-Fi use. In some examples, the paging group indicator and/or the indication of the time window may be received in a SIB and/or a MIB. In some examples, the paging group indicator and/or the indication of the time window may be received in an RRC message. In some examples, the predetermined time may be associated with a CET or an LBT procedure. For example, the transmission may be received during a transmission period or a duration of an LBT radio frame. In some examples, the transmission may include a plurality of paging group indicators and may signal different time windows for different ones of the plurality of paging indicators. In some examples, the time window may include a period immediately following the transmission. The operation(s) at block 1605 may be performed using the wireless communication management component 920, 1020, and/or 1360 described with reference to FIG. 9, 10, and/or 13, the paging group management component 935 and/or 1035 and/or the time window management component 940 and/or 1040 described with reference to FIG. 9 and/or 10, and/or the transmission monitoring component 1060 described with reference to FIG. 10.

In some examples, the paging group indicator may correspond to each UE connected to a base station. In some examples, the paging group indicator may correspond to a subset of UEs connected to the base station.

At block 1610, the method may include determining whether the paging group indicator received at block 1605 corresponds to a paging group associated with the UE. When it is determined that the paging group indicator corresponds to a paging group associated with the UE, the method 1600 may proceed to block 1615. When it is determined that the paging group indicator does not correspond to a paging group associated with the UE, the method 1600 may, in some examples, wait for another occurrence of the operation(s) at block 1605. The operation(s) at block 1610 may be performed using the wireless communication management component 920, 1020, and/or 1360 described with reference to FIG. 9, 10, and/or 13, and/or the paging group management component 935 and/or 1035 described with reference to FIG. 9 and/or 10.

At block 1615, the method 1600 may include monitoring the unlicensed radio frequency spectrum band during the time window to receive a paging message from a base station (e.g., a base station of an eNB). The monitoring may be performed in response to the determination made at block 1610 (e.g., the monitoring may be based on the paging group indicator). In some examples, the monitoring may include waking up a receiver of the UE from a sleep state prior to the time window. The operation(s) at block 1615 may be performed using the wireless communication management component 920, 1020, and/or 1360 described with reference to FIG. 9, 10, and/or 13, the paging message monitoring component 945 and/or 1065 described with reference to FIG. 9 and/or 10, and/or the monitoring component 1050 and/or the receiver power control component 1055 described with reference to FIG. 10.

In some examples, the monitoring performed at block 1615 may also or alternatively include monitoring the unlicensed radio frequency spectrum band during a periodic fixed subframe location.

At block 1620, the method 1600 may include receiving a paging message from the base station. In some examples, the paging message may be an asynchronous paging message received during the time window. In some examples, the transmission of the paging message may be a transmission subject to CCA, which transmission may be received during the periodic fixed subframe location. The operation(s) at block 1620 may be performed using the wireless communication management component 920, 1020, and/or 1360 described with reference to FIG. 9, 10, and/or 13, the paging message monitoring component 945 and/or 1065 described with reference to FIG. 9 and/or 10, and/or the monitoring component 1050 and/or the paging message processing component 1075 described with reference to FIG. 10.

In some examples of the method 1600, the transmission in which the indication of the paging group indicator and the indication of the time window are received may include at least a portion of the paging message received at block 1620.

In some examples of the method 1600, the time window for which the indication is received at block 1605 may be associated with a different set of subcarrier frequencies of the unlicensed radio frequency spectrum band than a transmission of the paging message subject to CCA. In the same or alternative examples of the method 1600, the time window may overlap in time with the periodic fixed subframe location monitored at block 1615.

At block 1625, the method 1600 may include receiving an indication of an end of the paging message from the base station. The operation(s) at block 1625 may be performed using the wireless communication management component 920, 1020, and/or 1360 described with reference to FIG. 9, 10, and/or 13, and/or the monitoring component 1050 and/or the end of paging message monitoring component 1070 described with reference to FIG. 10.

Thus, the method 1600 may provide for wireless communication. It should be noted that the method 1600 is just one implementation and that the operations of the method 1600 may be rearranged or otherwise modified such that other implementations are possible.

In some examples, aspects of one or more of the methods 1500 and/or 1600 described with reference to FIG. 15 and/or 16 may be combined.

Figure 17:
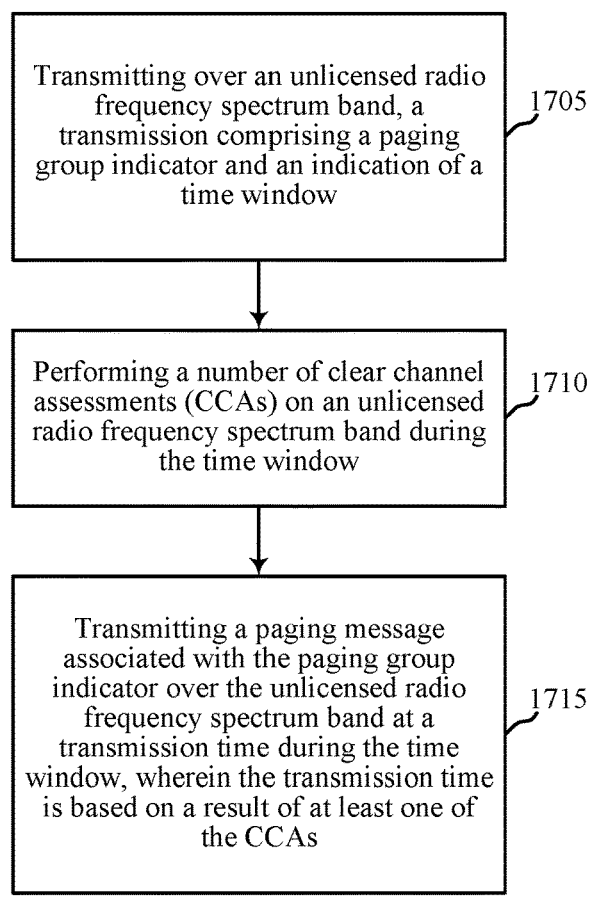
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the base stations 105, 205, 205-a, and/or 1405 described with reference to FIG. 1, 2, and/or 14, and/or aspects of one or more of the apparatuses 1105 and/or 1205 described with reference to FIG. 11 and/or 12. In some examples, a base station (e.g., a base station of an eNB) or apparatus may execute one or more sets of codes to control the functional elements of the base station or apparatus to perform the functions described below. Additionally or alternatively, the base station or apparatus may perform one or more of the functions described below using special-purpose hardware.

At block 1705, the method 1700 may include transmitting a transmission including a paging group indicator and an indication of a time window. The transmission may be transmitted over an unlicensed radio frequency spectrum band. In some examples, the unlicensed radio frequency spectrum band may include a radio frequency spectrum band for which apparatuses may contend for access because the radio frequency spectrum band is available for unlicensed use, such as Wi-Fi use. In some examples, the indication of the time window may be transmitted in a SIB and/or a MIB. In some examples, the indication of the time window may be transmitted in an RRC message. The operation(s) at block 1705 may be performed using the wireless communication management component 1120, 1220, and/or 1460 described with reference to FIG. 11, 12, and/or 14, the paging group management component 1135 and/or 1235 and/or the time window management component 1140 and/or 1240 described with reference to FIG. 11 and/or 12, and/or the transmission management component 1250 and/or the CET management component 1255 described with reference to FIG. 12.

At block 1710, the method 1700 may include performing a number of CCAs on the unlicensed radio frequency spectrum band during the time window. In some examples, the number of CCAs may include a single CCA. In some examples, the number of CCAs may include a plurality of CCAs. The operation(s) at block 1710 may be performed using the wireless communication management component 1120, 1220, and/or 1460 described with reference to FIG. 11, 12, and/or 14, and/or the CCA management component 1145 and/or 1245 described with reference to FIG. 11 and/or 12.

At block 1715, the method 1700 may include transmitting a paging message associated with the paging group indicator. The paging message may be transmitted over the unlicensed radio frequency spectrum band at a transmission time during the time window. The transmission time may be based at least in part on a result of at least one of the CCAs performed at block 1710. The operation(s) at block 1715 may be performed using the wireless communication management component 1120, 1220, and/or 1460 described with reference to FIG. 11, 12, and/or 14, the paging message management component 1150 and/or 1260 described with reference to FIG. 11 and/or 12, and/or the transmission management component 1250 described with reference to FIG. 12.

Thus, the method 1700 may provide for wireless communication. It should be noted that the method 1700 is just one implementation and that the operations of the method 1700 may be rearranged or otherwise modified such that other implementations are possible.

Figure 18:
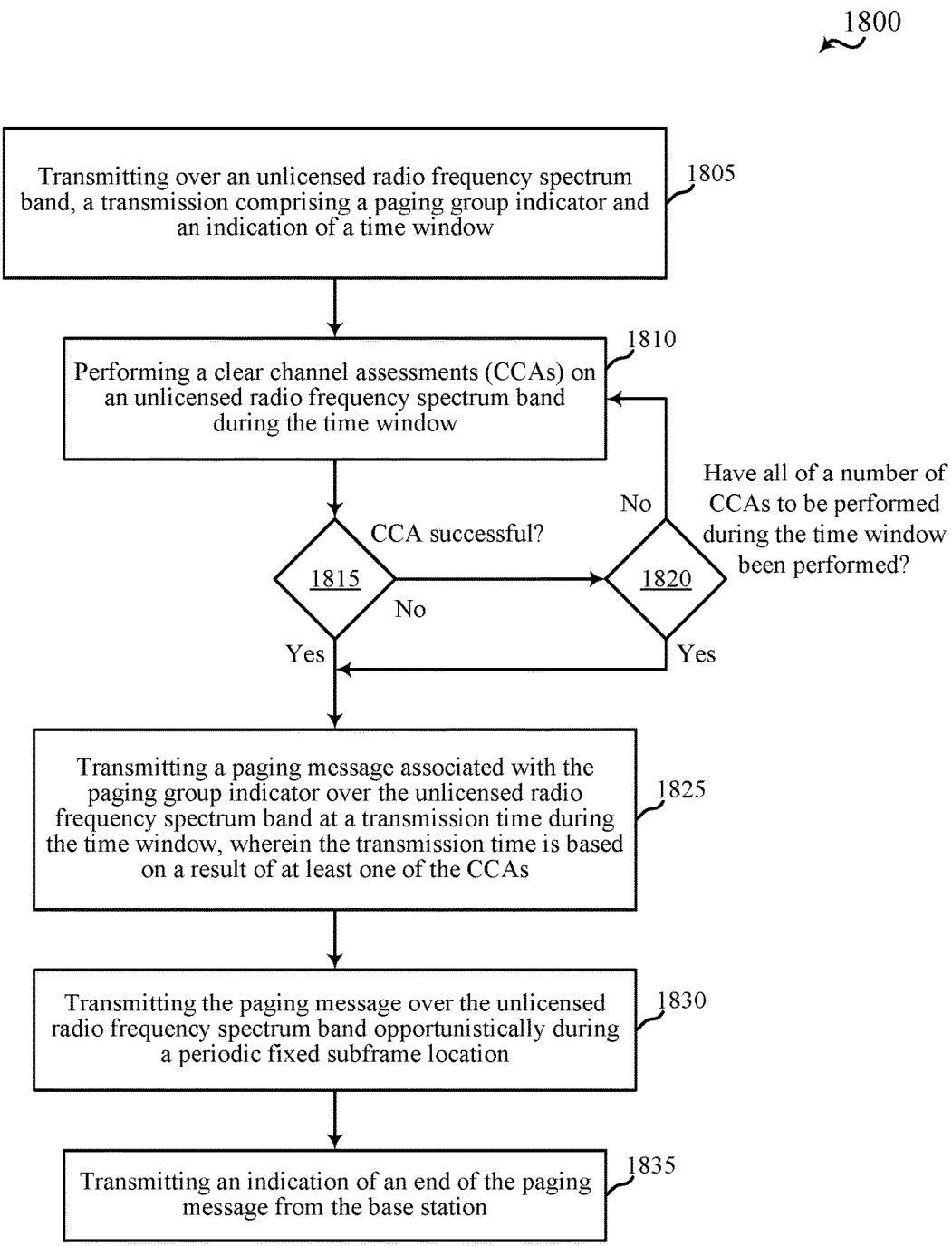
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the base stations 105, 205, 205-a, and/or 1405 described with reference to FIG. 1, 2, and/or 14, and/or aspects of one or more of the apparatuses 1105 and/or 1205 described with reference to FIG. 11 and/or 12. In some examples, a base station (e.g., a base station of an eNB) or apparatus may execute one or more sets of codes to control the functional elements of the base station or apparatus to perform the functions described below. Additionally or alternatively, the base station or apparatus may perform one or more of the functions described below using special-purpose hardware.

At block 1805, the method 1800 may include transmitting a transmission including a paging group indicator and an indication of a time window. The transmission may be transmitted over an unlicensed radio frequency spectrum band. In some examples, the unlicensed radio frequency spectrum band may include a radio frequency spectrum band for which apparatuses may contend for access because the radio frequency spectrum band is available for unlicensed use, such as Wi-Fi use. In some examples, the indication of the time window may be transmitted in a SIB and/or a MIB. In some examples, the indication of the time window may be transmitted in an RRC message. In some examples, the CET may include a plurality of paging group indicators and may signal different time windows for different ones of the paging indicators. In some examples, the time window may include a period immediately following the CET. The operation(s) at block 1705 may be performed using the wireless communication management component 1120, 1220, and/or 1460 described with reference to FIG. 11, 12, and/or 14, the paging group management component 1135 and/or 1235 and/or the time window management component 1140 and/or 1240 described with reference to FIG. 11 and/or 12, and/or the transmission management component 1250 and/or the CET management component 1255 described with reference to FIG. 12.

In some examples, the paging group indicator may correspond to each UE connected to the base station. In some examples, the paging group indicator may correspond to a subset of UEs connected to the base station.

At block 1810, block 1815, and/or block 1820, the method 1800 may include performing a number of CCAs on the unlicensed radio frequency spectrum band during the time window. More specifically, and at block 1810, the method 1800 may include performing a CCA on the unlicensed radio frequency spectrum band during the time window. At block 1815, the method 1800 may include determining whether the CCA was successful. When it is determined that the CCA was successful, the method 1800 may proceed to block 1825. When it is determined that the CCA was not successful, the method 1800 may proceed to block 1820. At block 1820, the method 1800 may include determining whether all of a number of CCAs to be performed during the time window have been performed. In some examples, the number of CCAs may include a single CCA. In some examples, the number of CCAs may include a plurality of CCAs. When it is determined that at least one CCA of the number of CCAs has not yet been performed, the method 1800 may include performing a next CCA of the number of CCAs at block 1810. When it is determined that each of the CCAs in the number of CCAs has already been performed, and/or that none of the number of CCAs performed during the time window were successful, the method 1800 may proceed to block 1825. The operation(s) at block 1810, 1815, and/or 1820 may be performed using the wireless communication management component 1120, 1220, and/or 1460 described with reference to FIG. 11, 12, and/or 14, and/or the CCA management component 1145 and/or 1245 described with reference to FIG. 11 and/or 12.

At block 1825, the method 1800 may include transmitting a paging message associated with the paging group indicator. The paging message may be transmitted over the unlicensed radio frequency spectrum band at a transmission time during the time window. The transmission time may be based at least in part on a result of at least one of the CCAs performed at block 1810. In some examples, the transmission time may follow a first successful one of the CCAs performed during the time window at block 1810, as identified at block 1815. In some examples, the transmission time may follow a last unsuccessful one of the CCAs performed during the time window at block 1810, as identified at block 1820, and/or the transmission time may occur at an end of the time window. The operation(s) at block 1825 may be performed using the wireless communication management component 1120, 1220, and/or 1460 described with reference to FIG. 11, 12, and/or 14, the paging message management component 1150 and/or 1260 described with reference to FIG. 11 and/or 12, and/or the transmission management component 1250 described with reference to FIG. 12.

In some examples of the method 1800, the transmission in which the indication of the paging group indicator and the indication of the time window are transmitted may include at least a portion of the paging message transmitted at block 1825.

At block 1830, the method 1800 may include transmitting the paging message over the unlicensed radio frequency spectrum band opportunistically, during a periodic fixed subframe location (e.g., following the successful performance of a CCA during a periodic LBT radio frame). In some examples, the time window may be associated with a different set of subcarrier frequencies of the unlicensed radio frequency spectrum band than the transmission of the paging message subject to CCA. In the same or alternative examples of the method 1800, the time window may overlap in time with the periodic fixed subframe location. The operation(s) at block 1840 may be performed using the wireless communication management component 1120, 1220, and/or 1460 described with reference to FIG. 11, 12, and/or 14, the paging message management component 1150 and/or 1260 described with reference to FIG. 11 and/or 12, and/or the transmission management component 1250 described with reference to FIG. 12.

At block 1835, the method 1800 may include transmitting an indication of an end of the paging message from the base station. The operation(s) at block 1835 may be performed using the wireless communication management component 1120, 1220, and/or 1460 described with reference to FIG. 11, 12, and/or 14, and/or the transmission management component 1250 and/or the end of paging message management component 1265 described with reference to FIG. 12.

Thus, the method 1800 may provide for wireless communication. It should be noted that the method 1800 is just one implementation and that the operations of the method 1800 may be rearranged or otherwise modified such that other implementations are possible.

In some examples, aspects of one or more of the methods 1700 and/or 1800 described with reference to FIG. 17 and/or 18 may be combined.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), flash memory, compact disk (CD)-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
    transmitting, over an unlicensed radio frequency spectrum band, a clear channel assessment (CCA)-exempt transmission (CET) comprising a paging group indicator and an indication of a time window;
    performing a number of clear channel assessments (CCAs) on the unlicensed radio frequency spectrum band during the time window; and
    transmitting a paging message associated with the paging group indicator over the unlicensed radio frequency spectrum band at a transmission time during the time window, wherein the transmission time is based on a result of at least one of the number of CCAs.

2. The method of claim 1, wherein performing the number of CCAs on the unlicensed radio frequency spectrum band during the time window comprises:
    identifying a first successful one of the number of CCAs during the time window;

wherein the transmission time follows the first successful one of the number of CCAs during the time window.

3. The method of claim 1, wherein performing the number of CCAs on the unlicensed radio frequency spectrum band during the time window comprises:
   determining that none of the number of CCAs performed during the time window were successful;
   wherein the transmission time occurs at an end of the time window.

4. The method of claim 1, further comprising:
   transmitting an indication of an end of the paging message.

5. The method of claim 1, wherein the time window comprises a period immediately following the CET.

6. The method of claim 1, wherein the CET comprises at least a portion of the paging message.

7. The method of claim 1, wherein the paging group indicator corresponds to each UE connected to a base station.

8. The method of claim 1, wherein the paging group indicator corresponds to a subset of UEs connected to a base station.

9. The method of claim 1, wherein the CET comprises a plurality of paging group indicators and signals a different time window for different ones of the plurality of paging group indicators.

10. The method of claim 1, further comprising:
    transmitting the paging message over the unlicensed radio frequency spectrum band opportunistically during a periodic fixed subframe location.

11. The method of claim 10, wherein the time window is associated with a different set of subcarrier frequencies of the unlicensed radio frequency spectrum band than the opportunistic transmitted paging message.

12. The method of claim 10, wherein the time window overlaps in time with the periodic fixed subframe location.

13. The method of claim 1, wherein the indication of the time window is transmitted in a system information block or a master information block.

14. The method of claim 1, wherein the indication of the time window is transmitted in a radio resource control (RRC) message.

15. An apparatus for wireless communication, comprising:
    a processor;
    memory in electronic communication with the processor; and
    instructions stored in the memory, the instructions being executable by the processor to:
       transmit, over an unlicensed radio frequency spectrum band, a clear channel assessment (CCA)-exempt transmission (CET) comprising a paging group indicator and an indication of a time window;
       perform a number of clear channel assessments (CCAs) on the unlicensed radio frequency spectrum band during the time window; and
       transmit a paging message associated with the paging group indicator over the unlicensed radio frequency spectrum band at a transmission time during the time window, wherein the transmission time is based on a result of at least one of the number of CCAs.

16. The apparatus of claim 15, wherein the instructions to perform the number of CCAs on the unlicensed radio frequency spectrum band during the time window are executable by the processor to:
    identify a first successful one of the number of CCAs during the time window;
    wherein the transmission time follows the first successful one of the number of CCAs during the time window.

17. The apparatus of claim 15, wherein the instructions to perform the number of CCAs on the unlicensed radio frequency spectrum band during the time window are executable by the processor to:
    determine that none of the number of CCAs performed during the time window were successful;
    wherein the transmission time occurs at an end of the time window.

18. The apparatus of claim 15, wherein the instructions are executable by the processor to:
    transmit an indication of an end of the paging message.

19. The apparatus of claim 15, wherein the time window comprises a period immediately following the CET.

20. The apparatus of claim 15, wherein the CET comprises at least a portion of the paging message.

21. The apparatus of claim 15, wherein the paging group indicator corresponds to each UE connected to a base station.

22. The apparatus of claim 15, wherein the paging group indicator corresponds to a subset of UEs connected to a base station.

23. The apparatus of claim 15, wherein the CET comprises a plurality of paging group indicators and signals a different time window for different ones of the plurality of paging group indicators.

24. The apparatus of claim 15, wherein the instructions are executable by the processor to:
    transmit the paging message over the unlicensed radio frequency spectrum band opportunistically during a periodic fixed subframe location.

25. The apparatus of claim 24, wherein the time window is associated with a different set of subcarrier frequencies of the unlicensed radio frequency spectrum band than the opportunistic transmitted paging message.

26. The apparatus of claim 24, wherein the time window overlaps in time with the periodic fixed subframe location.

27. The apparatus of claim 15, wherein the indication of the time window is transmitted in a system information block or a master information block.

28. The apparatus of claim 15, wherein the indication of the time window is transmitted in a radio resource control (RRC) message.

29. An apparatus for wireless communication, comprising:
    means for transmitting, over an unlicensed radio frequency spectrum band, a clear channel assessment (CCA)-exempt transmission (CET) comprising a paging group indicator and an indication of a time window;
    means for performing a number of clear channel assessments (CCAs) on the unlicensed radio frequency spectrum band during the time window; and
    means for transmitting a paging message associated with the paging group indicator over the unlicensed radio frequency spectrum band at a transmission time during the time window, wherein the transmission time is based on a result of at least one of the number of CCAs.

30. A non-transitory computer-readable medium storing code for wireless communication, the code comprising instructions executable by a processor to:
    transmit, over an unlicensed radio frequency spectrum band, a clear channel assessment (CCA)-exempt transmission (CET) comprising a paging group indicator and an indication of a time window;

perform a number of clear channel assessments (CCAs) on the unlicensed radio frequency spectrum band during the time window; and transmit a paging message associated with the paging group indicator over the unlicensed radio frequency spectrum band at a transmission time during the time window, wherein the transmission time is based on a result of at least one of the number of CCAs.

\* \* \* \* \*